US009716830B2

(12) United States Patent
Baek

(10) Patent No.: US 9,716,830 B2
(45) Date of Patent: Jul. 25, 2017

(54) IMAGE SIGNAL PROCESSING DEVICE PERFORMING IMAGE SIGNAL PROCESSING THROUGH PLURAL CHANNELS

(71) Applicant: SAMSUNG ELECTRONICS CO., LTD., Suwon-si, Gyeonggi-do (KR)

(72) Inventor: Byung-Joon Baek, Goyang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 9 days.

(21) Appl. No.: 14/972,834

(22) Filed: Dec. 17, 2015

(65) Prior Publication Data
US 2016/0239936 A1 Aug. 18, 2016

(30) Foreign Application Priority Data

Feb. 13, 2015 (KR) ........................ 10-2015-0022296

(51) Int. Cl.
G06K 9/54 (2006.01)
H04N 5/232 (2006.01)
H04N 1/00 (2006.01)
H04N 5/225 (2006.01)

(52) U.S. Cl.
CPC ........... *H04N 5/23241* (2013.01); *H04N 1/00* (2013.01); *H04N 5/2258* (2013.01); *H04N 5/23245* (2013.01)

(58) Field of Classification Search
CPC .... G06T 1/20; G06T 1/60; G06T 5/00; G06T 5/20; G06F 15/8023; H04N 5/14
See application file for complete search history.

(56) References Cited

U.S. PATENT DOCUMENTS

| 5,667,440 A | * | 9/1997 | Sasaki | .................... A63F 13/12 348/E7.07 |
| 6,021,454 A | * | 2/2000 | Gibson | ............... G06F 13/4004 709/200 |
| 8,687,079 B2 | | 4/2014 | Kobayashi et al. | |

(Continued)

FOREIGN PATENT DOCUMENTS

| JP | 2009-081774 | 4/2009 |
| JP | 2010-134743 | 6/2010 |

(Continued)

*Primary Examiner* — Amir Alavi
(74) *Attorney, Agent, or Firm* — F. Chau & Associates, LLC

(57) ABSTRACT

An image signal processing device includes a channel converter to divide an input signal stream, that includes image signals generated by a plurality of pixels, by processing units and generate a plurality of processing unit signals, an image signal processing core including a plurality of image processing channels each performing an image signal processing operation, and generating a plurality of output unit signals by receiving and processing the plurality of processing unit signals in parallel through one or more of the plurality of image processing channels, a channel combiner to combine the plurality of output unit signals and generate an output signal stream, and a configuration controller to control, according to an operation mode, at least one of the number of the plurality of processing unit signals, selection of a frequency of a processing clock signal, and combination of the plurality of output unit signals.

20 Claims, 14 Drawing Sheets

(56) References Cited

U.S. PATENT DOCUMENTS

| | | | |
|---|---|---|---|
| 8,736,695 B2 | 5/2014 | Hwang et al. | |
| 8,773,713 B2 | 7/2014 | Kimura | |
| 8,786,615 B2 | 7/2014 | Sasaki et al. | |
| 2002/0169902 A1* | 11/2002 | Horiuchi | G06F 13/24 710/69 |
| 2007/0126921 A1* | 6/2007 | Gallagher | G06T 5/20 348/362 |
| 2013/0100146 A1 | 4/2013 | Rao et al. | |
| 2013/0207824 A1* | 8/2013 | Waters | H03M 1/12 341/155 |
| 2013/0315555 A1 | 11/2013 | Shim | |
| 2016/0239936 A1* | 8/2016 | Baek | H04N 5/23241 |

FOREIGN PATENT DOCUMENTS

| | | |
|---|---|---|
| JP | 2010-153992 | 7/2010 |
| KR | 1020060106187 | 10/2006 |

* cited by examiner

IMAGE SIGNAL PROCESSING DEVICE PERFORMING IMAGE SIGNAL PROCESSING THROUGH PLURAL CHANNELS

CROSS-REFERENCE TO RELATED APPLICATIONS

The present application claims priority under 35 U.S.C. §119 to Korean Patent Application No. 10-2015-0022296 filed on Feb. 13, 2015, in the Korean Intellectual Property Office, the entire contents of which are incorporated by reference herein.

TECHNICAL FIELD

The present disclosure relates to an electronic device for processing images, and more particularly, relates to an image signal processing device capable of performing operations for processing image signals through a plurality of channels.

DESCRIPTION OF THE RELATED ART

Various kinds of electronic devices have been used in recent years. An electronic device generates electric signals and receives electric signals from other electronic devices. An electronic device uses the generated electric signals or the received electric signals to perform functions.

An example of a widely used electronic device is an image signal processing device. Such an image signal processing device receives image signals as electric signals including information associated with an image. The image signal processing device performs operations for processing the received image signals. For example, the image signal processing device is capable of performing image signal processing operations such as bad pixel correction, demosaicing, and noise reduction. The image signal processing device performs image signal processing operations to generate a final image data.

When an image signal processing device performs many operations, a large amount of power is consumed. As the demand for high resolution images increases power consumption has become a major issue. If a portable electronic device using a battery includes an image signal processing device, power consumption becomes a significant issue.

Furthermore, as various types of images are used, it is desirable to perform operations for processing the image signals to generate various types of images. To generate and process various types of images, an image signal processing device that may be flexibly configured to diverse operating conditions is required.

SUMMARY

The present disclosure provides an image signal processing device having a configuration for various operations according to an operation mode. An image signal processing device according to exemplary embodiments of the present disclosure may perform an image signal processing operation in parallel through a plurality of image processing channels.

In some exemplary embodiments, an image signal processing device may include a channel converter, an image signal processing core, a channel combiner, and a configuration controller. The channel converter may divide an input signal stream, that includes image signals generated by a plurality of pixels of an image sensor, by processing units and generate a plurality of processing unit signals. The image signal processing core may include a plurality of image processing channels. Each of the image processing channels may perform an image signal processing operation. The image signal processing core may generate a plurality of output unit signals by receiving and processing the processing unit signals in parallel through one or more of the image processing channels. The channel combiner may combine the output unit signals and generate an output signal stream. The configuration controller may control, according to an operation mode, at least one of the number of the processing unit signals, selection of a frequency of a processing clock signal that is used to provide the processing unit signals in parallel to the image signal processing core, combination of the output unit signals, and any combination thereof. The number of image processing channels, that are allocated to process the processing unit signals from among the plurality of image processing channels may vary based on at least one of the operation mode, the number of the processing unit signals, and any combination thereof.

In some exemplary embodiments, an image signal processing device may include a channel converter, an image signal processing core, a channel combiner, and a configuration controller. The channel converter may divide a first input signal stream, that includes first image signals generated by a first plurality of pixels of an image sensor, by processing units and generate a first plurality of processing unit signals. The channel converter may divide a second input signal stream, that includes second image signals generated by a second plurality of pixels of the image sensor, by the processing units and generate a second plurality of processing unit signals. The image signal processing core may include a plurality of image processing channels. Each of the image processing channels may perform an image signal processing operation. The image signal processing core may generate a plurality of output unit signals by receiving and processing the first and second processing unit signals in parallel through one or more of the image processing channels. The channel combiner may combine the output unit signals and generate at least one output signal stream. The configuration controller may control, according to an operation mode, at least one of the number of the first plurality of processing unit signals, the number of the second plurality of processing unit signals, selection of a frequency of a processing clock signal that is used to provide the first and second plurality of processing unit signals in parallel to the image signal processing core, makeup of the combination of the output unit signals, and any combination thereof. The number of image processing channels that are allocated to process the first plurality of processing unit signals and the number of image processing channels that are allocated to process the second plurality of processing unit signals, from among the image processing channels, may vary based on at least one of the operation mode, the number of the first plurality of processing unit signals, the number of the second plurality of processing unit signals, and any combination thereof.

In some exemplary embodiments an image signal processing device may include a channel convert, an image signal processing core and a channel combiner. The channel converter may receive an input signal stream from an image sensor, and may divide the input signal stream into one or more processing unit signals. The image signal processing core may include a plurality of image processing channels. The image processing channels may operate in parallel. The image signal processing core may perform an operation on one or more processing unit signals to generate one or more output unit signals. The channel combiner may combine one or more output unit signals to generate the output signal stream.

According to exemplary embodiments of the present disclosure, the image signal processing device may operate flexibly in accordance with an operation mode. Furthermore, the image signal processing device may consume less power.

BRIEF DESCRIPTION OF THE DRAWINGS

The above and other aspects, features, and advantages of certain embodiments of the present disclosure will become apparent from the following detailed description with reference to the following figures, wherein like reference numerals refer to like parts throughout the various figures unless otherwise specified.

DETAILED DESCRIPTION OF EMBODIMENTS

The aforementioned features and the following descriptions are exemplarily provided to help the understanding about exemplary embodiments of the present disclosure. The present disclosure, namely, may be embodied in a variety of different forms. The following exemplary embodiments are merely disclosures of some features of the present embodiment, and may fully convey the concept of the present disclosure to those skilled in the art. Therefore, it should be known that there may be many ways of implementing configurations of elements according to the present disclosure, and an individual way or any one of the equivalents thereof may be available to accomplish the present disclosure.

In the description, when a configuration is mentioned as including elements or some process is mentioned as including steps, it means that other elements or steps may be further included therein. The terms used herein are used merely for explaining a form of an exemplary embodiment, which should not be construed to limit the scope of the present disclosure. Furthermore, exemplary illustrations explained to help the understanding about the present disclosure may also include their complementary embodiments.

The terms used herein have meanings which are generally comprehensible by those skilled in the art. Generally used terms should be construed as being consistent in correspondence with coherence of description. The terms used herein should not be understood as having excessively ideal or formal meanings unless the meanings are defined clearly. Hereinafter, some exemplary embodiments of the present disclosure will be described in conjunction with accompanying drawings.

Figure 1:
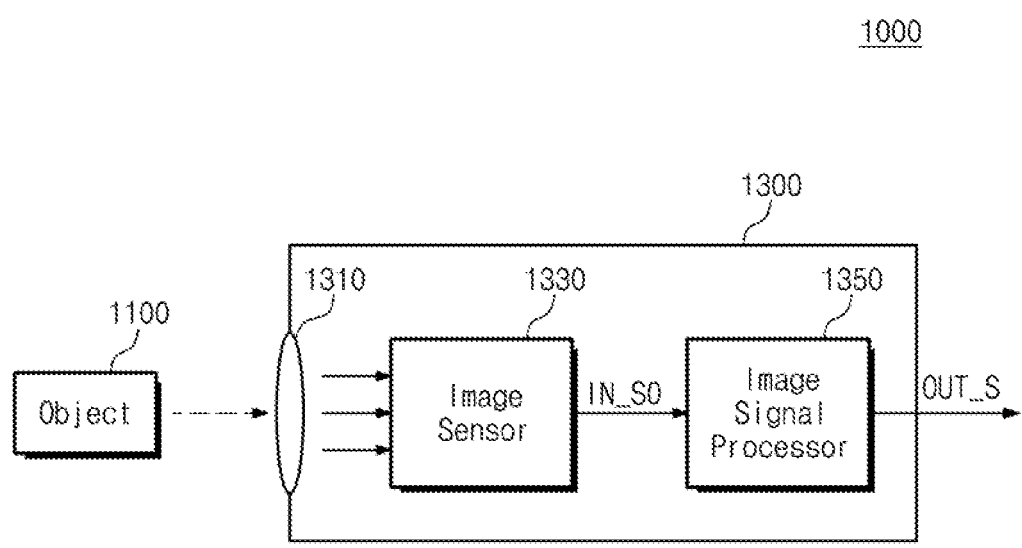
FIG. 1 is a block diagram illustrating an image capturing system that includes an image signal processing device according to an exemplary embodiment of the present disclosure.

FIG. 1 is a block diagram illustrating an image capturing system that includes an image signal processing device according to an exemplary embodiment of the present disclosure. The image capturing system 1000 may include an object 1100 and an image generation system 1300. The object 1100 is a target to be captured by the image sensor 1330. The image generation system 1100 may operate to generate an image of the object 1100.

As an exemplary embodiment, the image generation system 1300 may include a lens 1310, an image sensor 1330, and an image signal processor 1350. The image generation system 1300 may further include other elements that are not shown in FIG. 1. The image generation system 1300 shown in FIG. 1 is an example to help improve understanding of the present disclosure. The image generation system 1300 may generate the image of the object 1100.

The lens 1310 may receive light that is reflected by the object 1100 after being emitted from one or more light sources. In an exemplary embodiment, the image generation system 1300 may include one or more lenses. Light that passes through the lens 1310 may be provided to the image sensor 1330.

The image sensor 1330 may generate one or more image signals based on the light received through the lens 1310. The image signals may include information used to generate an image of the object 1100. Based on the image signals, the image of the object 1100 may be generated. In an exemplary embodiment of the present disclosure, these image signals may be included in an input signal stream IN_S0 and provided to the image signal processor 1350.

For example, the image sensor 1330 may include one or more light pass filters, and one or more photosensitive sensors. Each light pass filter may pass one of red light, green light, and blue light, but the present disclosure is not limited to this example. The photosensitive sensor may generate an electric signal, for example an image signal, having the electric characteristic, such as voltage, corresponding to the characteristic of the light that has passed the light pass filter, such as light intensity. One or more light pass filters and one or more photosensitive sensors may be arranged in a pixel unit. One image signal may be generated in association with each pixel.

The present disclosure is not limited to the aforementioned examples. Configuration of light pass filters, arrangement of light pass filters and photosensitive sensors, and generation of image signals may be changed or modified. For instance, the image sensor 1330 may further include various elements such as an infrared light pass filter and a phase difference auto-focus sensor.

The image signal processor 1350 may receive the input signal stream IN_S0. The image signal processor 1350 may perform operations for processing image signals included in the input signal stream IN_S0. The image of the object 1100 may be generated based on the image signals. However, in some cases, the image signals may not properly generate the image of the object 1100. To generate the appropriate image, the image signal processor 1350 may perform an image signal processing operation.

For example, the image signal processor 1350 may perform image signal processing operations, such as bad pixel correction, demosaicing, noise reduction, lens shading correction, gamma correction, and edge enhancement. However, the present disclosure is not limited thereto. The image signal processor 1350 may further perform other image signal processing operations.

The image signal processor 1350 may perform the image signal processing operation to generate image signals used to generate the appropriate image. In an exemplary embodiment of the present disclosure, the image signals may be output in an output signal stream OUT_S. Based on the image signals included in the output signal stream OUT_S, an appropriate image, such as an image of the object 1100, may be generated.

The image signal processor 1350 may be implemented in hardware. For instance, the image signal processor 1350 may include analog circuits and/or logic circuits for performing image signal processing operations. Alternatively, the image signal processor 1350 may be implemented with an operation processing unit. The operation processing unit may perform an image signal processing operation by executing instruction codes stored in a read-only memory (ROM), or program codes loaded into a random access memory (RAM). However, these instances do not limit the scope of the present disclosure.

In an exemplary embodiment, as shown in FIG. 1, the image signal processor 1350 may be included in the same device with the image sensor 1330. The image generation system 1300 may be implemented in a portable electronic device including the image sensor 1330 and the image signal processor 1350, such as a digital camera, a smart phone, a wearable device, and other electronic devices.

In another exemplary embodiment, unlike FIG. 1, a device including the image signal processor 1350 may be provided separately from a device including the image sensor 1330. In this exemplary embodiment, the device including the image sensor 1330 may be just a capturing device, and the device including the image signal processor 1350 may be a computing device that includes one or more processors. The capturing device and the device including the image signal processor 1350 may be implemented in various ways, not restricted to the configuration shown in FIG. 1.

In an exemplary embodiment, as shown in FIG. 1, the image signal processor 1350 may be an image signal processing circuit, an image signal processing chip, or an image signal processing device, that is provided separately from the image sensor 1330. In this exemplary embodiment, when the image generation system 1300 is a portable electronic device, the image sensor 1330 may be an image sensor chip that is provided separately from the image signal processor 1350, and the image signal processor 1350 may be an image signal processing circuit, an image signal processing chip, or an image signal processing device that is included in an application processor.

In another exemplary embodiment, unlike FIG. 1, the image signal processor 1350 may be partially or wholly included in the image sensor 1330. In this exemplary embodiment, the image sensor 1330 may perform an image signal processing operation, as well as generating image signals. The image sensor 1330 may be included in an image signal processing device together with the image signal processor 1350.

The exemplary embodiments of the present disclosure may be implemented in various configurations, not restrictive to the configuration shown in FIG. 1. The term "image signal processing device" that will be mentioned below may include the image signal processor 1350. Alternatively, the "image signal processing device" may include the image signal processor 1350 and a part of the image sensor 1330, or only the image sensor 1330.

Figure 2:
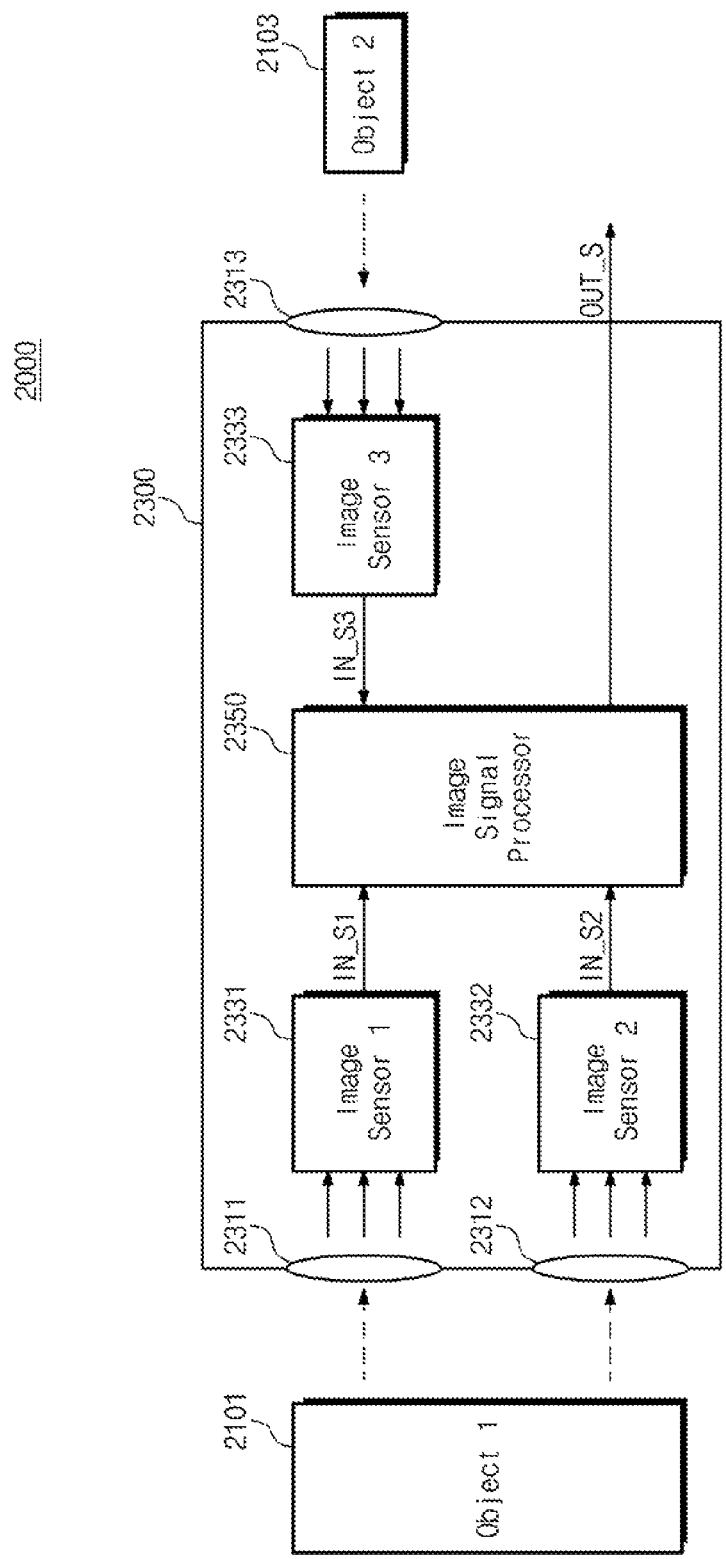
FIG. 2 is a block diagram illustrating an image capturing system that includes an image signal processing device according to an exemplary embodiment of the present disclosure.

FIG. 2 is a block diagram illustrating an image capturing system that includes an image signal processing device according to an exemplary embodiment of the present disclosure. An image capturing system 2000 may include a first object 2101, a second object 2103, and an image generation system 2300. Each of the first object 2101 and the second object 2103 may be a target to be captured. The image generation system 2300 may generate images of the first object 2101 and the second object 2103.

The image generation system 2300 may include a first lens 2311, a second lens 2312, a third lens 2313, a first image sensor 2331, a second image sensor 2332, a third image sensor 2333, and an image signal processor 2350. Configurations and functions of the first lens 2311, the second lens 2312, and the third lens 2313 may be similar to those of the lens 1310 shown in FIG. 1. Configurations and functions of the first image sensor 2331, the second image sensor 2332, and the third image sensor 2333 may be similar to those of the image sensor 1330 shown in FIG. 1. Configurations and functions of the image signal processor 2350 may be similar to those of the image signal processor 1350 shown in FIG. 1. Redundant descriptions associated with configurations and functions of the first lens 2311, the second lens 2312, the third lens 2313, the first image sensor 2331, the second image sensor 2332, the third image sensor 2333, and the image signal processor 2350 will be omitted below for brevity.

Unlike the image generation system 1300 of FIG. 1, the image generation system 2300 may include multiple lenses 2311, 2312, and 2313 and multiple image sensors 2331, 2332, and 2333. For instance, the first lens 2311 and the second lens 2312 may be "front" lenses, and the third lens 2313 may be a "rear" lens. The image generation system 2300 may employ multiple lenses to generate images of multiple objects.

The first image sensor 2331, the second image sensor 2332, and the third image sensor 2333 may receive light respectively through the first lens 2311, the second lens 2312, and the third lens 2313. The first image sensor 2331, the second image sensor 2332, and the third image sensor 2333 may provide a first input signal stream IN_S1, a second input signal stream IN_S2, and a third input signal stream IN_S3, respectively, to the image signal processor 2350. The first image sensor 2331, the second image sensor 2332, and the third image sensor 2333 may operate concurrently or independently in accordance with an operation mode.

The image signal processor 2350 may perform an image signal processing operation on the first input signal stream IN_S1, the second input signal stream IN_S2, and the third input signal stream IN_S3. The image signal processor 2350 may generate an output signal stream OUT_S. In an exemplary embodiment of FIG. 2, one image signal processor 2350 may be provided. The one image signal processor 2350 may process all of the first input signal stream IN_S1, the second input signal stream IN_S2, and the third input signal stream IN_S3.

According to an exemplary embodiment of FIG. 2, an image signal processing device may consume less power in compared to a configuration where multiple image signal processors are provided to the first image sensor 2331, the second image sensor 2332, and the third image sensor 2333 respectively. Additionally, an image signal processing device may easily select different operating modes, and more efficiently use shared resources. Image signal processing devices according to exemplary embodiments of the present disclosure will be described in more detail with reference to FIGS. 3 to 12.

In the description with FIG. 2, three lenses and three image sensors have been mentioned, whereas the numbers of the lenses and the image sensors may be more or less than the amount shown in FIG. 2. Additionally, the number of the objects, locations of the lenses, and functions of the image generation system 2300 may be more or less than the amount shown in FIG. 2. The exemplary embodiments of the present disclosure are not limited to the configuration shown in FIG. 2.

Figure 3:
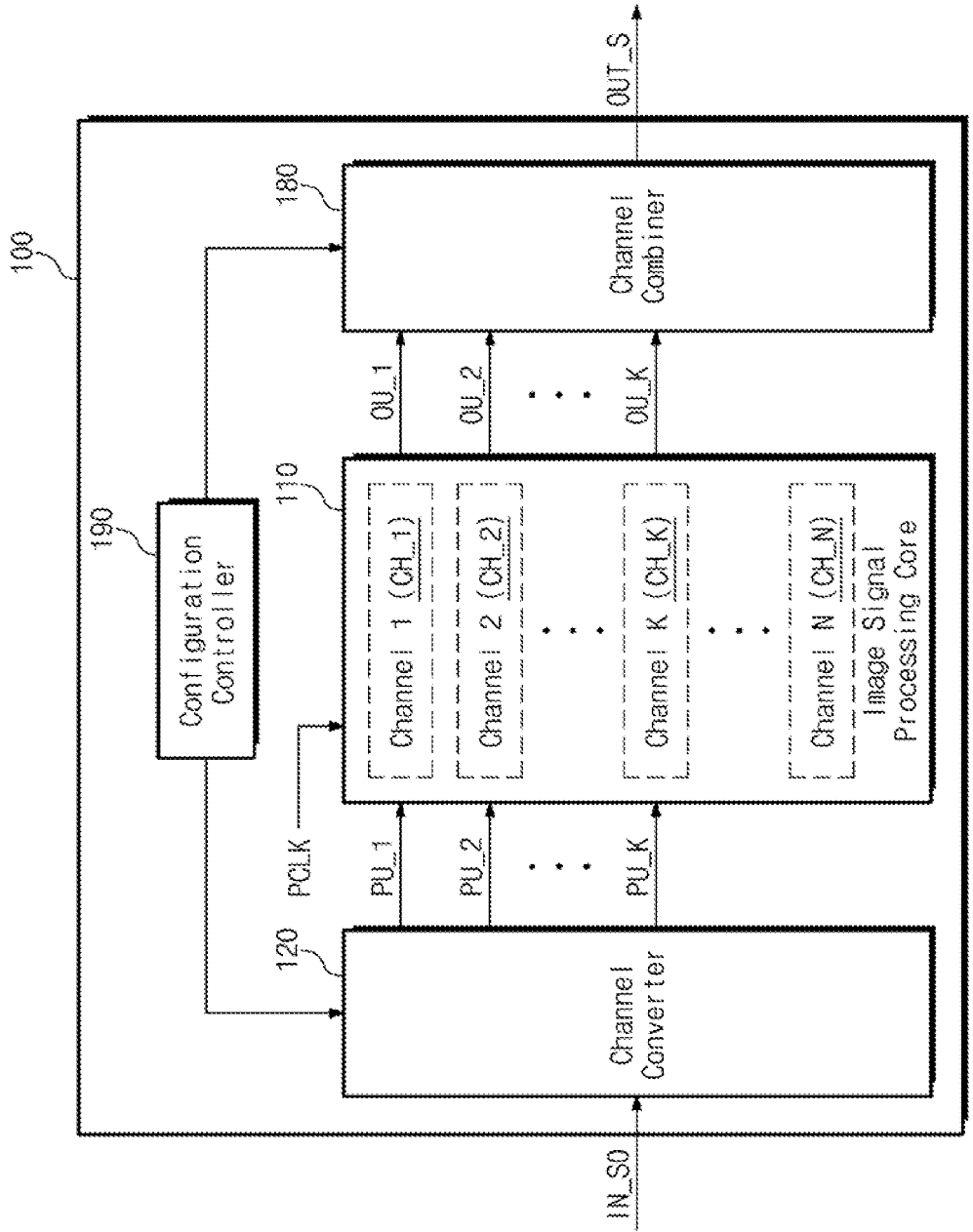
FIG. 3 is a block diagram illustrating an image signal processing device according to an exemplary embodiment of the present disclosure.

FIG. 3 is a block diagram illustrating an image signal processing device according to an exemplary embodiment of the present disclosure. An image signal processing device 100 may include an image signal processing core 110, a channel converter 120, a channel combiner 180, and a configuration controller 190.

As aforementioned, the image signal processing device 100 may be implemented in an image sensor (e.g., the image sensor 1330 of FIG. 1, or at least one of the first image sensor 2331, the second image sensor 2332, and the third image sensor 2333 of the FIG. 2) and/or an image signal processor (e.g., at least one of the image signal processor 1350 of FIG. 1 and the image signal processor 2350 of FIG. 2). The image signal processing device 100 may receive an input signal stream IN_S0 and generate an output signal stream OUT_S.

The image signal processing core 110 may include a plurality of image processing channels CH_1 to CH_N. Each of the image processing channels CH_1 to CH_N may perform an image signal processing operation. For instance, each of the image processing channels CH_1 to CH_N may perform image signal processing operations such as bad pixel correction, demosaicing, noise reduction, lens shading correction, gamma correction, and edge enhancement, but the exemplary embodiments of the present disclosure are not limited to these operations. The image processing channels CH_1 to CH_N may perform image signal processing operations in parallel (e.g., concurrently).

The channel converter 120 may receive the input signal stream IN_S0. For instance, the input signal stream IN_S0 may be provided from an image sensor circuit. The input signal stream IN_S0 may include image signals that are generated by a plurality of pixels. The channel converter 120 may divide the input signal stream IN_S0 by the processing units, and generate a plurality of processing unit signals PU_1 to PU_K. The "processing unit" is a unit that each of the processing unit signals PU_1 to PU_K has to perform image signal processing operations through the image processing channels CH_1 to CH_N. The channel converter 120 may "convert" one input signal stream IN_S0 into the processing unit signals PU_1 to PU_K, that are provided to the image processing channels CH_1 to CH_N.

As an exemplary embodiment, the processing unit signals PU_1 to PU_K may be image signals that respectively correspond to pixel units of the plurality of pixels of the image sensor. One processing unit signal, namely, may correspond to an image signal that is generated by one pixel. However, the exemplary embodiment of the present disclosure is not limited thereto. Each of the processing unit signals PU_1 to PU_K may include image signals that correspond to two to more pixels. Configurations of the processing unit signals PU_1 to PU_K may be variously changed or modified.

As an exemplary embodiment, the number of the processing unit signals PU_1 to PU_K may be equal to or smaller than the total number of the image processing channels CH_1 to CH_N. In regard to FIG. 3, the number of the processing unit signals PU_1 to PU_K is indicated as being smaller than the number of the image processing channels CH_1 to CH_N (e.g., N>K). In this configuration, some of the image processing channels CH_1 to CH_N may not operate.

Unlike FIG. 3, the processing unit signals PU_1 to PU_K may be generated as many as the number of the image processing channels CH_1 to CH_N (e.g., N=K). In this configuration, all of the image processing channels CH_1 to CH_N may operate to process the processing unit signals PU_1 to PU_K. As will be mentioned below, the number of the processing unit signals PU_1 to PU_K may be changed or modified in accordance with an operation mode.

The image signal processing core 110 may receive the processing unit signals PU_1 to PU_K through some of the image processing channels CH_1 to CH_K (e.g., when N>K). Alternatively, the image signal processing core 110 may receive the processing unit signals PU_1 to PU_K through all of the image processing channels CH_1 to CH_K (e.g., when N=K). The image signal processing core 110 may receive the processing unit signals PU_1 to PU_K in parallel in response to a processing clock signal PCLK. After the input signal stream IN_S0 is divided into the processing unit signals PU_1 to PU_K, the processing unit signals PU_1 to PU_K may be provided in parallel to the image signal processing core 110 in response to the processing clock signal PCLK.

Additionally, the image signal processing core 110 may process the processing unit signals PU_1 to PU_K in parallel through one or more of the image processing channels CH_1 to CH_N. The image signal processing core 110 may generate a plurality of output unit signals OU_1 to OU_K by performing an image signal processing operation on the processing unit signals PU_1 to PU_K. The "output unit" is a unit where each of the output unit signals OU_1 to OU_K has been generated after an image signal processing operation is performed by one or more of the image processing channels CH_1 to CH_N.

For example, the first image processing channel CH_1 may generate the first output unit signal OU_1 by performing an image signal processing operation on the first processing unit signal PU_1. As further example, the K-th image processing channel CH_K may generate the K-th output unit signal OU_K by performing an image signal processing operation on the K-th processing unit signal PU_K.

The number of the processing unit signals PU_1 to PU_K may be changed or modified in accordance with an operation mode. For instance, when an operation mode is performed using only one image processing channel (e.g., the first image processing channel CH_1), one processing unit signal (e.g., the first processing unit signal PU_1) may be just generated. As will be described below, as the number of the image processing channels CH_1 to CH_K that operate increases, the image signal processing device 100 may consume less power. For instance, when an operation mode is performed to consume the least power, the processing unit signals PU_1 to PU_K may be generated as many as the number of the image processing channels CH_1 to CH_N.

As an exemplary embodiment, the number of the image processing channels CH_1 to CH_K allocated to process the processing unit signals PU_1 to PU_K may vary based on the number of the processing unit signals PU_1 to PU_K. Alternatively, the number of the image processing channels CH_1 to CH_K allocated to process the processing unit signals PU_1 to PU_K may vary in accordance with an operation mode. However, these exemplary embodiments are merely provided to help understanding of the present disclosure, and not to limit the present disclosure. The number of the image processing channels CH_1 to CH_K that operate may vary based on different criteria.

Accordingly, each of the image processing channels CH_1 to CH_N may perform or may not perform an image signal processing operation according to the exemplary embodiments. According to the exemplary embodiments of the present disclosure, the image signal processing device 100 may operate flexibly depending on an operation mode. In particular, as will be described later, when a plurality of input signal streams is provided, resources (e.g., the image processing channels CH_1 to CH_K) may be efficiently distributed to the input signal streams.

As an exemplary embodiment, each of the image processing channels CH_1 to CH_N may be configured to process a type of the processing unit signals. For instance, the first image processing channel CH_1 may process the processing unit signals that correspond to a pixel including a green light pass filter, and the second image processing channel CH_2 may process the processing unit signals that correspond to a pixel including a blue light pass filter. According to this exemplary embodiment, the image processing channels CH_1 to CH_N may be reduced in complexity of configuration and the image signal processing core 110 may be reduced in size.

As an exemplary embodiment, there may be as many output unit signals OU_1 to OU_K as the number of the image processing channels CH_1 to CH_K that operate. In another exemplary embodiment, based on a configuration of the image processing channels CH_1 to CH_N, the number of the output unit signals OU_1 to OU_K may be larger or smaller than the number of the image processing channels CH_1 to CH_K that operate. The number of the signals and the number of the image processing channels CH_1 to CH_N shown in FIG. 3 are merely provided to help understanding of the present disclosure, and not to limit the present disclosure.

The channel combiner 180 may combine the output unit signals OU_1 to OU_K that are provided from the image signal processing core 110. The channel combiner 180 may combine the output unit signals OU_1 to OU_K to generate the output signal stream OUT_S. The output signal stream OUT_S may include image signals that are processed by the image signal processing core 110. Based on the image signals included in the output signal stream OUT_S, an appropriate image of an object may be generated.

The configuration controller 190 may manage the overall operations of the image signal processing device 100 in accordance with an operation mode. As an exemplary embodiment, the configuration controller 190 may control an operation of the channel converter 120 to change the number of the processing unit signals PU_1 to PU_K. The configuration controller 190 may select a frequency of the processing clock signal PCLK which is suitable to provide the processing unit signals PU_1 to PU_K in parallel to the image signal processing core 110. The configuration controller 190 may control the channel combiner 180 to control the combining of the output unit signals OU_1 to OU_K.

The aforementioned exemplary embodiments are merely provided to help understanding of the present disclosure, and not to limit the present disclosure. The configuration controller 190 may further perform other processes. In an exemplary embodiment, the configuration controller 190 may control the division of the input signal stream IN_S0, one or more of the image processing channels CH_1 to CH_N to perform an image signal processing operation in parallel, and generating the output signal stream OUT_S.

An operation mode may be selected in various manners. For example, an operation mode may be selected by a user of the image signal processing device 100. Alternatively, an operation mode may be selected based on an operating condition of the image signal processing device 100. An operation mode may be selected by at least one of the configuration controller 190, firmware driving the image signal processing device 100, an external control signal, and/or any combination thereof. In an exemplary embodiment, the configuration controller 190 may include one or more control registers. The control registers may store configuration values corresponding to the selected operation mode. The configuration controller 190 may control components of the image signal processing device 100 based on the configuration values that correspond to the selected operation mode. However, this exemplary embodiment is merely provided to help understanding of the present disclosure, and not to limit the present disclosure.

As an exemplary embodiment, the image signal processing core 110, the channel converter 120, the channel combiner 180, and the configuration controller 190 may be implemented in an image sensor. As another exemplary embodiment, the image signal processing core 110, the channel converter 120, the channel combiner 180, and the configuration controller 190 may be implemented in an operation processing device including an application processor. Alternatively, the image signal processing core 110, the channel converter 120, the channel combiner 180, and the configuration controller 190 may be distributed throughout an image sensor and an operation processing device.

Each of the image signal processing core 110, the channel converter 120, the channel combiner 180, and the configuration controller 190 may be implemented in an image sensor and/or an operation processing device.

Figure 4:
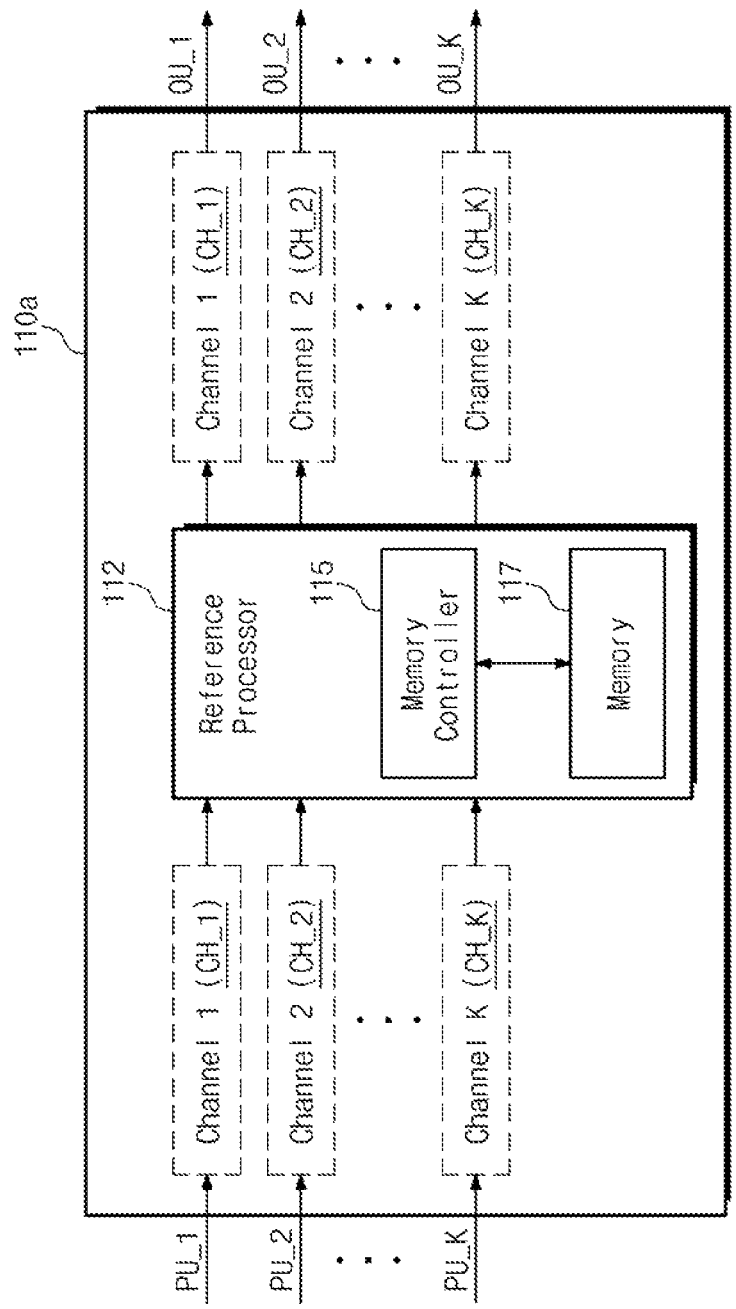
FIG. 4 is a block diagram illustrating an image signal processing core that is included in the image signal processing device of FIG. 3.

FIG. 4 is a block diagram illustrating an image signal processing core that is included in the image signal processing device of FIG. 3. An image signal processing core 110a may include a plurality of image processing channels CH_1 to CH_K and a reference processor 112. As an exemplary embodiment, the image signal processing core 110 of FIG. 3 may include the image signal processing core 110a.

Each of the image processing channels CH_1 to CH_K may perform an image signal processing operation. FIG. 4 illustrates only the image processing channels CH_1 to CH_K that are respectively allocated to the processing unit signals PU_1 to PU_K and respectively generate the output unit signals OU_1 to OU_K. However, in some exemplary embodiments, the image signal processing core 110a may further include one or more image processing channels that do not perform an image signal processing operation. The image processing channels CH_1 to CH_K has been described with reference to FIG. 3, thus redundant descriptions will be omitted below for brevity of the description.

Some image signal processing operations performed by the image processing channels CH_1 to CH_K may be carried out by processing only one processing unit signal (e.g., the second processing unit signal PU_2). However, some image signal processing operations may be performed to process one processing unit signal (e.g., the second processing unit signal PU_2) by referring to other processing unit signals (e.g., the first processing unit signal PU_1 and the third processing unit signal PU_3). For instance, an image signal processing operation such as bad pixel correction may be performed by referring to information associated with neighboring pixels.

In an exemplary embodiment, the image signal processing core 110a may include the reference processor 112. The reference processor 112 may operate to perform an image signal processing operation that, such as bad pixel correction, is performed by referring to other processing unit signals to process one processing unit signal. The reference processor 112 may process a target processing unit signal by referring to processing unit signals other than the target processing unit signal. In this exemplary embodiment, the reference processor 112 may refer to one or more of processing unit signals other than the target processing unit signal.

As an exemplary embodiment, the reference processor 112 may include a memory controller 115 and a memory 117. The memory controller 115 may control an operation of the memory 117. The memory 117 may store data associated with one or more of processing unit signals other than the target processing unit signal. For instance, the memory 117 may include at least one of a volatile memory such as a static random access memory (SRAM), a dynamic RAM (DRAM), or a synchronous DRAM (SDRAM), a nonvolatile memory such as a flash memory, a phase-change RAM (PRAM), a magneto-resistive RAM (MRAM), a resistive RAM (ReRAM), or a ferro-electric RAM (FRAM), and any combination thereof. Under the control by the memory controller 115, the reference processor 112 may refer to data that is stored in the memory 117.

In FIG. 4, the reference processor 112 is illustrated as being connected with all of the image processing channels CH_1 to CH_K. Unlike FIG. 4, the reference processor 112 may be connected only with some of the image processing channels CH_1 to CH_K. Furthermore, in FIG. 4, the image signal processing core 110a is illustrated as including one reference processor 112. Alternatively, the image signal processing core 110a may include a plurality of reference processors. The configuration shown in FIG. 4 is illustrated to further understanding of the present disclosure, and not to limit the present disclosure.

In FIG. 4, the reference processor 112 is illustrated as including the memory controller 115 and the memory 117. In an exemplary embodiment, the memory controller 115 and the memory 117 may be separately provided from the reference processor 112. For instance, the image signal processing core 110a may share the memory controller 115 and the memory 117 with other components that are included in a portable electronic device. The reference processor 112, the memory controller 115, and the memory 117 may be configured differently than the exemplary embodiment.

Figure 5:
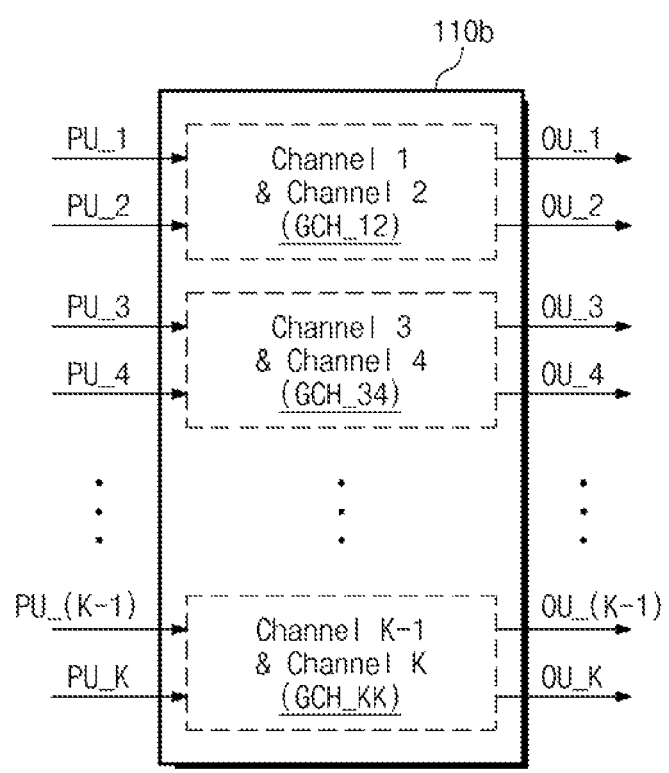
FIG. 5 is a block diagram illustrating an image signal processing core that is included in the image signal processing device of FIG. 3.

FIG. 5 is a block diagram illustrating an image signal processing core that is included in the image signal processing device of FIG. 3. An image signal processing core 110b may include a plurality of group channels GCH_12 to GCH_KK. In an exemplary embodiment, the image signal processing core 110 of FIG. 3 may include the image signal processing core 110b.

Each of the group channels GCH_12 to GCH_KK may include the selected number of image processing channels. For example, a plurality of image processing channels may be configured as a plurality of the group channels GCH_12 to GCH_KK, wherein each of the group channels GCH_12 to GCH_KK may include the selected number of image processing channels. Each of the group channels GCH_12 to GCH_KK may concurrently process the processing unit signals that respectively correspond to the selected number of the image processing channels.

For instance, each of the group channels GCH_12 to GCH_KK may include two image processing channels. In this instance, the first group channel GCH_12 may include the first image processing channel CH_1 (see FIG. 3) and the second image processing channel CH_2 (see FIG. 3). Additionally, the first group channel GCH_12 may process a first processing unit signal PU_1 and a second processing unit signal PU_2 that respectively correspond to the first image processing channel CH_1 and the second image processing channel CH_2. Each of group channels other than the first group channel GCH_12 may be configured and may operate similar to the first group channel GCH_12.

According to the exemplary embodiment shown in FIG. 4, each of the image processing channels CH_1 to CH_K may process one processing unit signal. Additionally, each of the processing unit signals PU_1 to PU_K may be allocated to one of the various image processing channels CH_1 to CH_K. Thus, according to the exemplary embodiment shown in FIG. 4, it is possible to adjust the amount of processing unit signals, image processing channels and output unit signals. Additionally, the differing number of processing input signals may be assigned to different image processing channels.

According to the exemplary embodiment shown in FIG. 5, the image processing channels with the selected number may be included in one group channel. The number of the group channels GCH_12 to GCH_KK shown in FIG. 5 may be smaller than the number of the image processing channels CH_1 to CH_K shown in FIG. 4. For instance, with regard to FIG. 4, when image signals corresponding to pixels of 5×5 size are processed through one image processing channel, each of the image processing channels CH_1 to CH_K may receive the processing unit signals corresponding to the pixels of 5×5. While with regard to FIG. 5 each of the group channels GCH_12 to GCH_KK may receive the processing unit signals corresponding to pixels of "6×5".

In FIG. 5, it is illustrated that two image processing channels are included in one group channel. However, the number of the image processing channels included in one group channel may vary. For instance, the number of the image processing channels included in one group channel may be selected in accordance with various criteria such as the flexibility of the image signal processing operation, performance of the image signal processing operation, the size of a logic circuit used in the image signal processing operation, and so on. Alternatively, as shown in FIG. 4, the individual image processing channels may be employed instead of the group channels.

FIGS. 4 and 5 are merely provided to describe some of possible exemplary embodiments of the present disclosure. The exemplary embodiments of the present disclosure are not limited to the configurations shown in FIGS. 4 and 5. The present disclosure may be implemented in other exemplary embodiments different from those shown in FIGS. 4 and 5.

Figure 6:
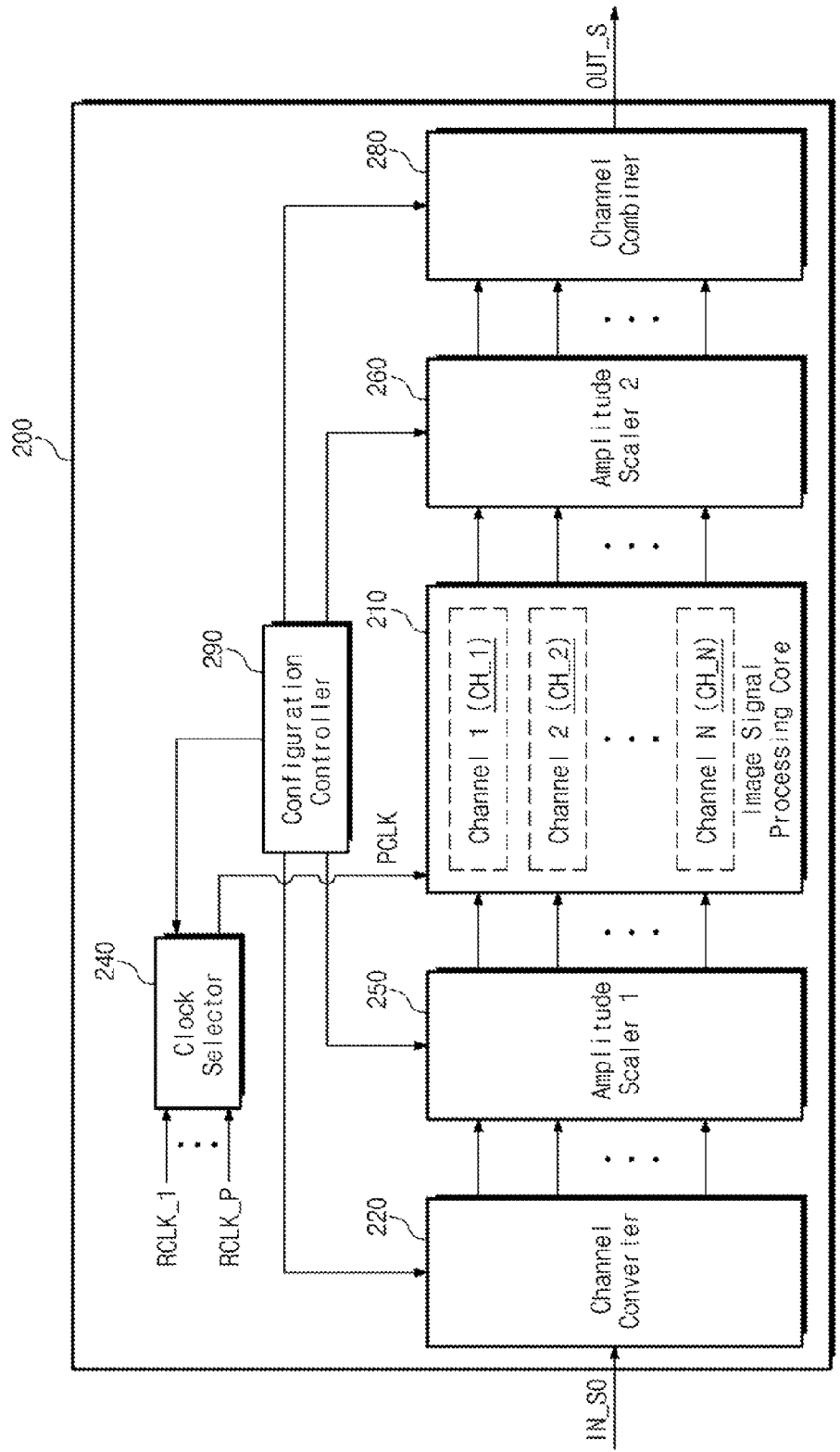
FIG. 6 is a block diagram illustrating an image signal processing device according to an exemplary embodiment of the present disclosure.

FIG. 6 is a block diagram illustrating an image signal processing device according to an exemplary embodiment of the present disclosure. An image signal processing device 200 may include an image signal processing core 210, a channel converter 220, a clock selector 240, a first amplitude scaler 250, a second amplitude scaler 260, a channel combiner 280, and a configuration controller 290.

The image signal processing device 200 may be implemented in an image sensor (e.g., the image sensor 1330 of FIG. 1, or at least one of the first image sensor 2331, the second image sensor 2332, and the third image sensor 2333 of FIG. 2), and/or an image signal processor (e.g., the image signal processor 1350 of FIG. 1, or the image signal processor of FIG. 2). The image signal processing device 200 may receive an input signal stream IN_S0 and generate an output signal stream OUT_S.

Configurations and functions of the image signal processing core 210, the channel converter 220, the channel combiner 280, and the configuration controller 290 may include those of the image signal processing core 110, the channel converter 120, the channel combiner 180, and the configuration controller 190 of FIG. 3. Thus, redundant descriptions associated with the image signal processing core 210, the channel converter 220, the channel combiner 280, and the configuration controller 290 will be omitted below for brevity of the description.

In FIG. 6, it is illustrated that all the image processing channels CH_1 to CH_N included in the image signal processing core 210 operate. However, some of the image processing channels CH_1 to CH_N may be allocated to process the processing unit signals. The configuration shown in FIG. 6 is not intended to limit the present disclosure.

The clock selector 240 may receive a plurality of reference clock signals RCLK1_1 to RCLK_P. For instance, the reference clock signals RCLK_1 to RCLK_P may be provided from an internal or external clock generation circuit of the image signal processing device 200. The reference clock signals RCLK_1 to RCLK_P may have different frequency values from one another. The clock selector 240 may select one of the reference clock signals RCLK_1 to RCLK_P in accordance with an operation mode. The clock selector 240 may output the selected reference clock signal as a processing clock signal PCLK. The clock selector 240 may provide the processing clock signal PCLK to the image signal processing core 210.

As an exemplary embodiment, the clock selector 240 may select one of the reference clock signals RCLK_1 to RCLK_P as the processing clock signal PCLK under the control of the configuration controller 290. For instance, the channel converter 220 may receive the input signal stream IN_S0 in response to a stream clock signal SCLK (see FIG. 7). For instance, the stream clock signal SCLK may be provided from an internal or external clock generation circuit of the image signal processing device 200. As an exemplary embodiment, the clock selector 240 may select a reference clock signal, from among the reference clock signals RCLK_1 to RCLK_P, that has a frequency value obtained by dividing a frequency value of the stream clock signal SCLK by the number of the allocated image processing channels.

For instance, when the channel converter 220 receives the input signal stream IN_S0 in response to the stream clock signal SCLK having a frequency value of 100 megahertz (MHz) and four (4) image processing channels are allocated to the processing unit signals, the clock selector 240 may select a reference clock signal that has a frequency value of 25 MHz (=100 MHz/4). Additionally, the image signal processing core 210 may receive in parallel the processing unit signals in response to the processing clock signal PCLK that has the frequency value of 25 MHz. To this end, each of the reference clock signals PCLK_1 to PCLK_P may have a frequency value that is reversely proportional to the frequency value of the stream clock signal SCLK.

According to an exemplary embodiment of the present disclosure, the image signal processing core 210 may perform parallel processing in response to the processing clock signal PCLK that has a low frequency value. Therefore, according to this exemplary embodiment, it is possible to reduce power consumed by the image signal processing device 200. Selecting frequency of the processing clock signal PCLK will be further described later with reference to FIG. 8.

The first amplitude scaler 250 may adjust each of amplitudes of a plurality of processing unit signals PU_1 to PU_K (see FIG. 3) that are generated by the channel converter 220. For instance, the first amplitude scaler 250 may adjust each of voltage amplitudes of the processing unit signals PU_1 to PU_K.

In the exemplary embodiments of the present disclosure, the image signal processing core 210 may receive in parallel the processing unit signals PU_1 to PU_K in response to the processing clock signal PCLK having a low frequency value. Accordingly, a time margin for providing the processing unit signals PU_1 to PU_K to the image signal processing core 210 is increased. Additionally, the processing unit signals PU_1 to PU_K may be provided to the image signal processing core 210 in a slower transmission rate. As a result, it may be fine to decrease the driving power for transferring the processing unit signals PU_1 to PU_K.

According to the exemplary embodiment of the present disclosure, it may be fine to decrease the amplitudes of the processing unit signals PU_1 to PU_K (e.g., it may be fine to decrease the driving power). As an exemplary embodiment, the first amplitude scaler 250 may reduce each of the voltage amplitudes of the processing unit signals PU_1 to PU_K.

According to the exemplary embodiment of the present disclosure, it is possible to reduce the voltage amplitudes of the processing unit signals PU_1 to PU_K. Therefore, according to this exemplary embodiment of the present disclosure, it is possible to further reduce power consumed by the image signal processing device 200. Adjusting the amplitudes of the processing unit signals PU_1 to PU_K will be further described later with reference to FIGS. 7 and 8.

The second amplitude scaler 260 may adjust each of amplitudes of a plurality of output unit signals OU_1 to OU_K (see FIG. 3) that are generated by the image signal processing core 210. For instance, the second amplitude scaler 260 may adjust each of voltage amplitudes of the output unit signals OU_1 to OU_K.

The output unit signals OU_1 to OU_K may have low amplitudes due to an operation of the first amplitude scaler 250. To restore the amplitudes of the output unit signals OU_1 to OU_K, the second amplitude scaler 260 may increase each of the amplitudes of the output unit signals OU_1 to OU_K. As an exemplary embodiment, the second amplitude scaler 260 may increase each of voltage amplitudes of the output unit signals OU_1 to OU_K. Accordingly, the output signal stream OUT_S having an appropriate amplitude may be generated.

As an exemplary embodiment, the first amplitude scaler 250 and the second amplitude scaler 260 may operate under the control of the configuration controller 290. Depending on an operation mode, the first amplitude scaler 250 may vary the amounts of adjusting each of the amplitudes of the processing unit signals PU_1 to PU_K. Additionally, depending on an operation mode, the second amplitude scaler 260 may vary the amounts of adjusting each of the amplitudes of the output unit signals OU_1 to OU_K.

As an exemplary embodiment, the image signal processing core 210 may receive multiple processing clock signals. In this exemplary embodiment, the image processing channels CH_1 to CH_N may operate in response to the processing clock signals with different frequency values. As an exemplary embodiment, the amounts of adjusting each of the amplitudes of the processing unit signals PU_1 to PU_K may be different in each of the image processing channels CH_1 to CH_N. Additionally, the amounts of adjusting each of the amplitudes of the output unit signals OU_1 to OU_K may be different in each of the image processing channels CH_1 to CH_N. These exemplary embodiments will be further described later with reference to FIG. 12.

Figure 7:
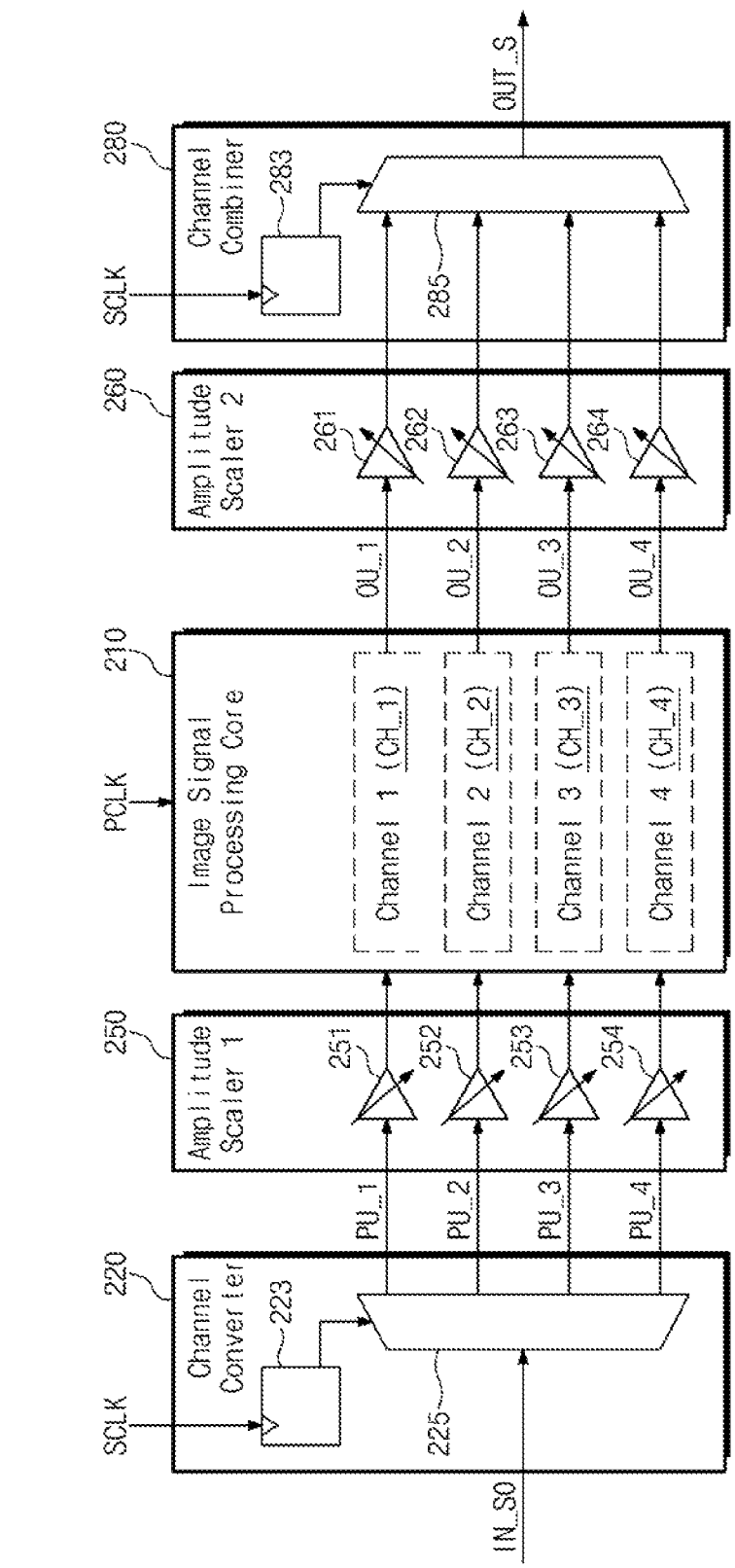
FIG. 7 is a block diagram illustrating the image signal processing device of FIG. 6 in more detail.

FIG. 7 is a block diagram illustrating the image signal processing device of FIG. 6 in more detail. In FIG. 7, the image signal processing device 200 is illustrated as including the image signal processing core 210, the channel converter 220, the first amplitude scaler 250, the second amplitude scaler 260, and the channel combiner 280. The configuration shown in FIG. 7 is merely provided for descriptive convenience, and not intended to limit the present disclosure. The image signal processing device 200 may further include other components not shown in FIG. 7, or may not include some of the components shown in FIG. 7.

To help understanding the present disclosure, FIG. 7 is illustrated such that the image signal processing core 210 includes four image processing channels CH_1 to CH_4. However, the number of the image processing channels may be variously changed or modified. Additionally, while FIG. 7 is illustrated such that all the image processing channels CH_1 to CH_4 included in the image signal processing core 210 operate some of the image processing channels CH_1 to CH_4 may be allocated to process the processing unit signals.

The image signal processing core 210 may receive in parallel the first to fourth processing unit signals PU_1 to PU_4 in response to a processing clock signal PCLK. For instance, according to the configuration shown in FIG. 7, the processing clock signal PCLK may have a frequency value with a quarter (¼) of a frequency value of a stream clock signal SCLK.

For instance, the channel converter 220 may include a counter 223 and a demultiplexer 225. The counter 223 may receive the stream clock signal SCLK. The counter 223 may provide a selection signal to the demultiplexer 225 in response to the stream clock signal SCLK. The demultiplexer 225 may output image signals that are included in the input signal stream IN_S0 as one of the first to fourth processing unit signals PU_1 to PU_4 in response to the selection signal.

For instance, the first amplitude scaler 250 may include first to fourth voltage level shifters 251 to 254. The first to fourth voltage level shifters 251 to 254 may adjust (e.g., decrease) amplitudes of the first to fourth processing unit signals PU_1 to PU_4, respectively.

For instance, the second amplitude scaler 260 may include fifth to eighth voltage level shifters 261 to 264. The fifth to eighth voltage level shifters 261 to 264 may adjust (e.g., increase) amplitudes of the first to fourth output unit signals OU_1 to OU_4, respectively.

For instance, the channel combiner 280 may include a counter 283 and a multiplexer 285. The counter 283 may receive the stream clock signal SCLK. The counter 283 may provide a selection signal to the multiplexer 285 in response to the stream clock signal SCLK. The multiplexer 285 may select one of first to fourth output unit signals OU_1 to OU_4 in response to the selection signal. According to the operation of the multiplexer 285, the output signal stream OUT_S may include image signals corresponding to the first to fourth output unit signals OU_1 to OU_4.

The configuration shown in FIG. 7 illustrates one of the possible exemplary embodiments for implementing the present disclosure. The configuration shown in FIG. 7 is merely provided to help understanding of the present disclosure, and not to limit the present disclosure. The present disclosure may be implemented in additional configurations different from that shown in FIG. 7.

Figure 8:
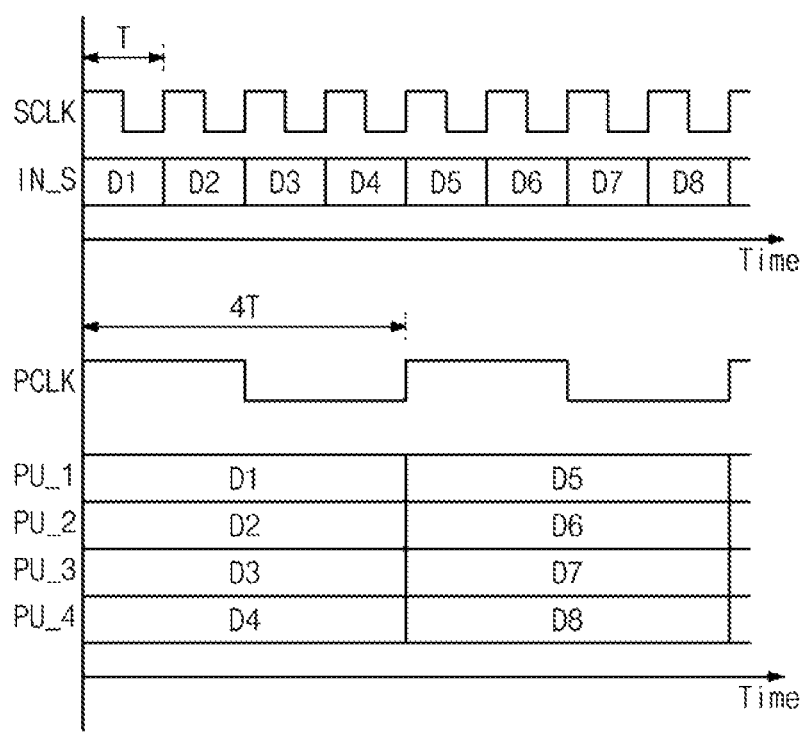
FIG. 8 is a timing diagram showing an effect obtained by using an image signal processing device according to an exemplary embodiment of the present disclosure.

FIG. 8 is a timing diagram showing an effect obtained by using an image signal processing device according to an exemplary embodiment of the present disclosure. For instance, FIG. 8 shows an effect obtained when the four (4) image processing channels CH_1 to CH_4 are employed as like the image signal processing device 200 of FIG. 7.

The channel converter 220 may receive a stream clock signal SCLK having a period of T. The channel converter 220 may receive image signals that are included in the input signal stream IN_S in response to the stream clock signal SCLK.

Meanwhile, when the four image processing channels CH_1 to CH_4 are employed, the image signal processing core 210 may receive a processing clock signal PCLK having a period of 4 T. The image signal processing core 210 may receive and process, in parallel, the processing unit signals PU_1 to PU_4 in response to the processing clock signal 210.

According to an exemplary embodiment of the present disclosure, the image signal processing core 210 may operate in response to the processing clock signal PCLK having a low frequency value. For instance, when the four image processing channels CH_1 to CH_4 are employed, as shown in FIG. 8, the period of the processing clock signal PCLK may be four times the period of the stream clock signal SCLK. A frequency value of the processing clock signal PCLK may be a quarter (¼) of a frequency value of the stream clock signal SCLK.

It is known that power consumed by an electronic circuit is roughly proportional to a frequency value of a clock signal that is used to operate the electronic circuit. Accordingly, as the frequency value of the processing clock signal PCLK becomes lower, power consumed by the image signal processing device 200 may be reduced.

In an exemplary embodiment of the present disclosure, as the frequency value of the processing clock signal PCLK becomes lower, a time margin for transferring the processing unit signals PU_1 to PU_4 may increase. For instance, as shown in FIG. 8, a time margin as long as 3 T (=4 T−T) may be secured. Accordingly, the processing unit signals PU_1 to PU_4 may be provided to the image signal processing core 210 in a slower transmission rate. As a result, the driving power for transferring the processing unit signals PU_1 to PU_4 may be decreased.

As the amplitude (e.g., a voltage amplitude) of a signal increases, the driving power required to transfer the signal may increase and the signal may be transferred in a higher transmission rate. Alternatively, as the amplitude of a signal decreases the driving power required to transfer the signal may decrease and the signal may be transferred in a slower transmission rate. It is known that the time for transferring a signal may increase approximately twice if the voltage of the signal is decreased to about 66%. It is also known that the time for transferring a signal may increase approximately four times if the voltage of the signal is decreased by about 52%.

In the exemplary embodiment of FIG. 8, it may be acceptable to take four times longer to transfer the processing unit signals PU_1 to PU_4 than to receive the input signal stream IN_S. Accordingly, the voltage of each of the processing unit signals PU_1 to PU_4 may be decreased to about 52%.

It is known that power consumed by an electronic device is roughly proportional to the square of a voltage of a signal that is transferred in the electronic device. In an exemplary embodiment of the present disclosure, as the voltages of the processing unit signals PU_1 to PU_4 decrease, power consumption of the image signal processing device 200 may be reduced. For instance, in case of FIG. 8, if the voltage of each of the processing unit signals PU_1 to PU_4 decreases to about 52%, power consumption may be reduced to about 27% (=100%×$0.52^2$).

In an exemplary embodiment of the present disclosure, the image signal processing core 210 may include a plurality of the image processing channels CH_1 to CH_N (see FIG. 6). Each of the image processing channels CH_1 to CH_N may be flexibly allocated to perform an image signal processing operation on the processing unit signal. Therefore, according to an exemplary embodiment of the present disclosure, the image signal processing operation may be more flexible.

Additionally, by employing the multiple image processing channels CH_1 to CH_N, a frequency value of the processing clock signal PCLK that is used by the image signal processing core 210 may be reduced, and voltages of the processing unit signals PU_1 to PU_K (see FIG. 3) may be reduced. Therefore, power consumption of the image signal processing device 200 may be reduced. According to an exemplary embodiment of the present disclosure, power consumed by the image signal processing core 210 that consumes the largest amount of power from among the components of the image signal processing device 200 may be greatly reduced. Accordingly, the total power consumption of the image signal processing device 200 may be greatly reduced.

Figure 9:
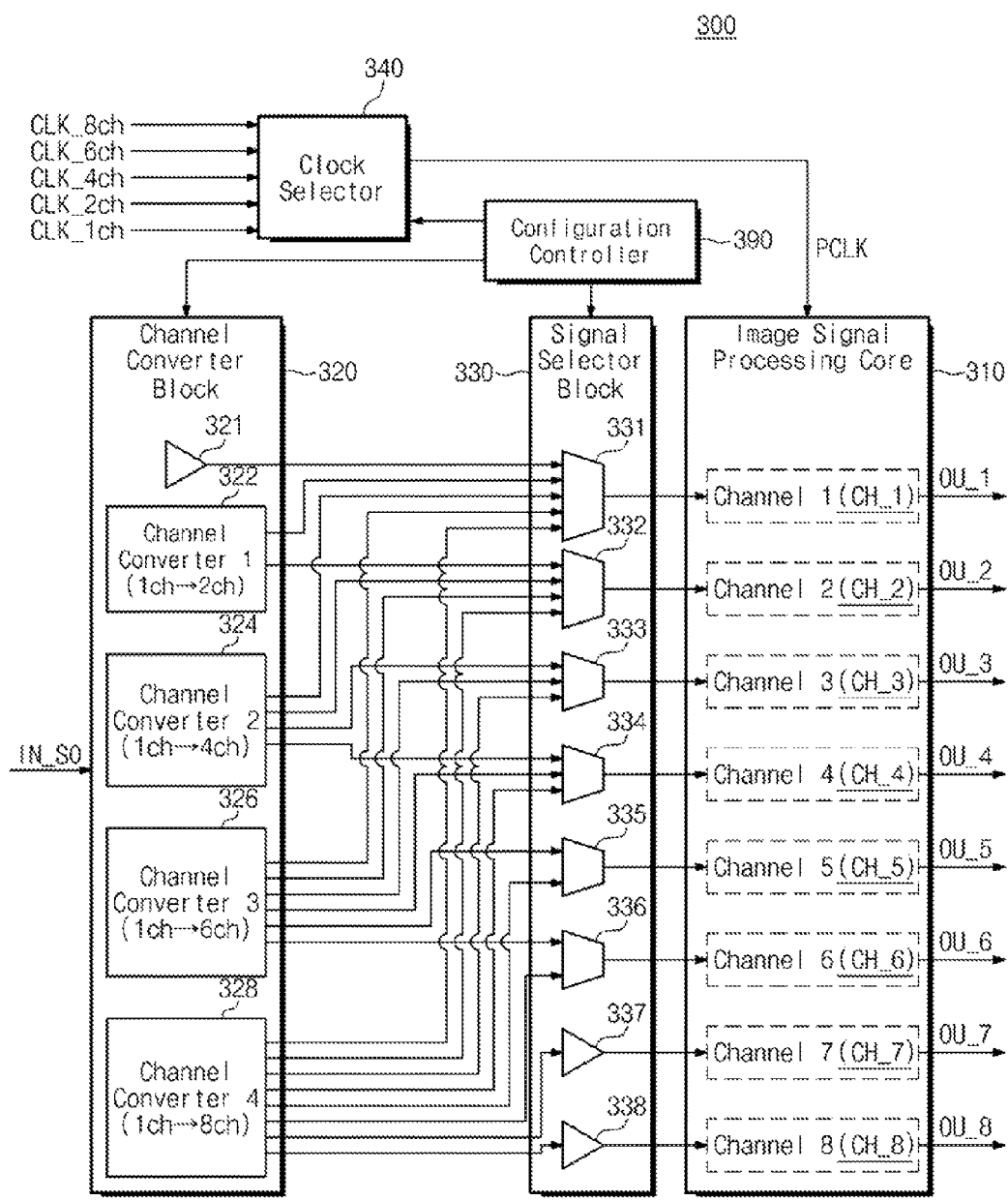
FIGS. 9 and 10 are block diagrams illustrating an image signal processing device according to an exemplary embodiment of the present disclosure.
Figure 10:
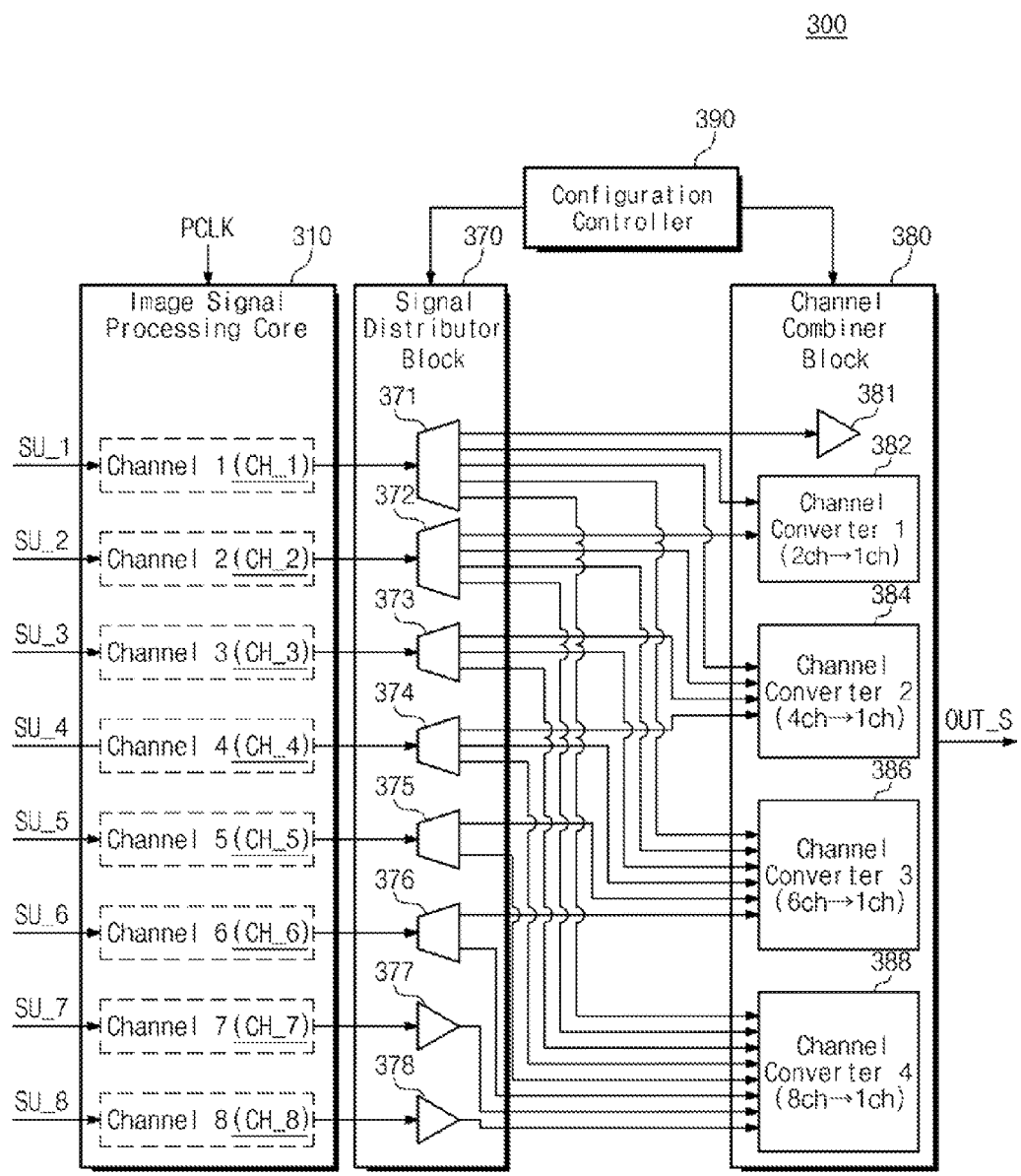

FIGS. 9 and 10 are block diagrams illustrating an image signal processing device according to an exemplary embodiment of the present disclosure. An image signal processing device 300 may include an image signal processing core 310, a channel converter block 320, a signal selector block 330, a clock selector 340, a signal distributor block 370, a channel combiner block 380, and a configuration controller 390. This exemplary embodiment will be described with reference to FIG. 9 together with FIG. 10.

The image signal processing device 300 may be implemented in an image sensor (e.g., the image sensor 1330 of FIG. 1, or at least one of the first image sensor 2331, the second image sensor 2332, and the third image sensor 2333 of FIG. 2) and/or an image signal processor (e.g., the image signal processor 1350 of the FIG. 1, or the image signal processor 2350 of FIG. 2). The image signal processing device 300 may receive an input signal stream IN_S0 and generate an output signal stream OUT_S.

Configurations and functions of the image signal processing core 310 may include those of the image signal processing core 110 shown in FIG. 3 or those of the image signal processing core 210 shown in FIG. 6. The image signal processing core 310 may include a plurality of image processing channels CH_1 to CH_8. Each of the image processing channels CH_1 to CH_8 may perform an image signal processing operation. Redundant descriptions associated with the image signal processing core 310 will be omitted below for brevity of the description.

In FIGS. 9 and 10, it is illustrated that the image signal processing core 310 includes eight (8) image processing channels CH_1 to CH_8. However, the number of the image processing channels may be variously changed or modified. Additionally, in FIGS. 9 and 10, it is illustrated that all the image processing channels CH_1 to CH_8 included in the image signal processing core 310 operate. However, the image signal processing core 310 may further include image processing channels that are not allocated to process the processing unit signals.

The channel converter block 320 may include first to fourth channel converters 322 to 328. Each of the first to fourth channel converters 322 to 328 may divide the input signal stream IN_S0 by the processing units and generate a plurality of processing unit signals. In an exemplary embodiment, the number of the processing unit signals generated by each of the first to fourth channel converters 322 to 328 may be different from one another.

For instance, the first channel converter 322 may divide the input signal stream IN_S0 to generate two (2) processing unit signals. The second channel converter 324 may divide the input signal stream IN_S0 to generate four (4) processing unit signals. Additionally, the third channel converter 326 may divide the input signal stream IN_S0 to generate six (6) processing unit signals, and the fourth channel converter 328 may divide the input signal stream IN_S0 to generate eight (8) processing unit signals. In a further embodiment, the channel converter block 320 may have X number of channel converters and each channel converter may divide the input signal stream IN_S0 into an increasingly higher number of processing unit signals. In this embodiment, the number of processing unit signals may be a power of 2.

Additionally, for instance, the channel converter block 320 may include a stream buffer 321. The stream buffer 321 may buffer the input signal stream IN_S0 without dividing the input signal stream IN_S0. When the stream buffer 321 operates, the input signal stream IN_S0 may be processed through one image processing channel (e.g., the first image processing channel CH_1) without channel conversion.

As an exemplary embodiment, one of the stream buffer 321 and the first to fourth channel converters 322 to 328 may operate in accordance with an operation mode. For instance, when an operation mode using four image processing channels (e.g., the first to fourth image processing channels CH_1 to CH_4) is selected, the second channel converter 324 may operate. On the other hand, when an operation mode using one image processing channel (e.g., the first image processing channel CH_1) is selected, the stream buffer 321 may operate.

Configurations and functions of the first to fourth channel converters 322 to 328 may include those of the channel converter 120 shown in FIG. 3 or those of the channel converter 220 shown in FIG. 6. Redundant descriptions associated with the first to fourth channel converters 322 to 328 will be omitted below for brevity of the description.

The signal selector block 330 may include first to eighth signal selectors 331 to 338. Each of the first to eighth signal selectors 331 to 338 may receive one of the processing unit signals as selection target signals from different combinations of the stream buffer 321 and the channel converters 322, 324, 326 and 328. Each of the first to eighth signal selectors 331 to 338 may select one of the selection target signals. The selected selection target signals SU_1 to SU_8 may be provided to the image signal processing core 310.

For instance, the first signal selector 331 may receive the input signal stream IN_S0 buffered by the stream buffer 321, one of two processing unit signals generated by the first channel converter 322, and one of four processing unit signals generated by the second channel converter 324. Additionally, the first signal selector 331 may receive one of six processing unit signals generated by the third channel converter 326, and one of eighth processing unit signals generated by the fourth channel converters 328. The first signal selector 331 may select one of the received signals. For instance, the first signal selector 331 may provide the selected signal to the first image processing channel CH_1 of the image signal processing core 310.

For instance, the second signal selector 332 may receive the other one of the two processing unit signals generated by the first channel converter 322, and another one of the four processing unit signals generated by the second channel converter 324. Additionally, the second signal selector 332 may receive another one of the six processing unit signals generated by the third channel converter 326, and another one of the eight processing unit signals generated by the fourth channel converters 328. The second signal selector 332 may select one of the received signals. For instance, the second signal selector 332 may provide the selected signal to the second image processing channel CH_2 of the image signal processing core 310.

For instance, the third signal selector 333 and the fourth signal selector 334 may respectively receive remaining two processing unit signals that are not provided to the first signal selector 331 and the second signal selector 332 from among the four processing unit signals generated by the second channel converter 324. The third to sixth signal selectors 332 may be configured similar to the first signal selector 331 and the second signal selector 332. In the exemplary embodiment shown in FIG. 9, the seventh signal selector 337 and the eighth signal selector 338 may simply buffer the processing unit signals received from the fourth channel converter 328.

As an exemplary embodiment, the first to eighth signal selectors 331 to 338 may operate partly or entirely in accordance with an operation mode. For instance, when an operation mode using four image processing channels (e.g., the first to fourth image processing channels CH_1 to CH_4) is selected, the first to fourth signal selectors 331 to 334 may operate. When an operation mode using one image processing channel (e.g., the first image processing channel CH_1) is selected, the first signal selector 331 may operate.

The image signal processing core 310 may receive the selection target signals SU_1 to SU_8 that are respectively selected by one or more of the signal selectors 331 to 338. The image signal processing core 310 may receive the selected selection target signals SU_1 to SU_8 in parallel through one or more of the image processing channels CH_1 to CH_8. The image signal processing core 310 may receive the selected selection target signals SU_1 to SU_8 in parallel in response to a processing clock signal PCLK. The image signal processing core 310 may process the selected selection target signals SU_1 to SU_8 in parallel through one or more of the image processing channels CH_1 to CH_8. The image signal processing core 310 may perform image signal processing operations on the selected selection target signals SU_1 to SU_8 to generate a plurality of output unit signals OU_1 to OU_8.

Configurations and functions of the clock selector 340 may include those of the clock selector 240 shown in FIG. 6. For instance, the clock selector 340 may receive a plurality of reference clock signals CLK_1ch to CLK_8ch. The reference clock signals $CLK_{13}$ 1ch to CLK_8ch may have different frequency values from one another. The clock selector 340 may select one of the reference clock signals CLK_1ch to CLK_8ch in accordance with an operation mode. The clock selector 340 may provide the selected reference clock signal as the processing clock signal PCLK to the image signal processing core 310.

As an exemplary embodiment, when an operation mode using four image processing channels (e.g., the first to fourth image processing channels CH_1 to CH_4) is selected, the clock selector 340 may select the reference clock signal CLK_4ch as the processing clock signal PCLK to operate the four image processing channels. When an operation mode using one image processing channel (e.g., the first image processing channel CH_1) is selected, the clock selector 340 may select the reference clock signal CLK_1ch as the processing clock signal PCLK to operate the one image processing channel. Selecting frequency of the processing clock signal PCLK has been aforementioned with reference to FIG. 8.

The channel combiner block 380 may include first to fourth channel combiners 382 to 388. Each of the first to fourth channel combiners 382 to 388 may receive one or more of the output unit signals OU_1 to OU_8. Each of the first to fourth channel combiners 382 to 388 may generate the output signal stream OUT_S by combining the received output unit signals. As an exemplary embodiment, the number of the output unit signals that are combined by each of the first to fourth channel combiners 382 to 388 may be different from one another.

For instance, the first channel combiner 382 may combine two output unit signals (e.g., the first output unit signals OU_1 and the second output unit signal OU_2) to generate the output signal stream OUT_S. The second channel combiner 384 may combine four output unit signals (e.g., the first to fourth output unit signals OU_1 to OU_4) to generate the output signal stream OUT_S. The third channel combiner 386 may combine six output unit signals (e.g., the first to sixth output unit signals OU_1 to OU_6) to generate the output signal stream OUT_S. The fourth channel combiner 388 may combine eight output unit signals (e.g., the first to eighth output unit signals OU_1 to OU_8) to generate the output signal stream OUT_S.

For instance, the channel combiner block 380 may include a stream buffer 381. The stream buffer 381 may generate the output signal stream OUT_S by buffering one output unit signal (e.g., the first output unit signal OU_1).

As an exemplary embodiment, one of the stream buffer 381 and the first to fourth channel combiners 382 to 388 may operate in accordance with an operation mode. For instance, when an operation mode using four image processing channels (e.g., the first to fourth image processing channels CH_1 to CH_4) is selected, the second channel combiner 384 may operate. When an operation mode using one image processing channel (e.g., the first image processing channel CH_1) is selected, the stream buffer 381 may operate.

Configurations and functions of each of the first to fourth channel combiners 382 to 388 may include those of the channel combiner 180 shown in FIG. 3 or the channel combiner 280 shown in FIG. 6. Redundant descriptions associated with the first to fourth channel combiners 382 to 388 will be omitted below for brevity of the description.

The signal distributor block 370 may include first to eighth signal distributers 371 to 378. The signal distributor block 370 may receive the output unit signals OU_1 to OU_8 from the image signal processing core 310. Each of the first to eighth signal distributors 371 to 378 may provide one of the output unit signals OU_1 to OU_8 to one or more of the stream buffer 381 and the channel combiners 382 to 388.

For instance, the first signal distributor 371 may receive the first output unit signal OU_1 from the first image processing channel CH_1. The first signal distributor 371 may provide the first output unit signal OU_1 to one of the stream buffer 381, the first channel combiner 382, and the second channel combiner 384. Alternatively, the first signal distributor 371 may provide the first output unit signal OU_1 to one of the third channel combiner 386 and the fourth channel combiner 388.

For instance, the second signal distributor 372 may receive the second output unit signal OU_2 from the second image processing channel CH_2. The second signal distributor 372 may provide the second output unit signal OU_2 to one of the first channel combiner 382 and the second channel combiner 384. Alternatively, the second signal distributor 372 may provide the second output unit signal OU_2 to one of the third channel combiner 386 and the fourth channel combiner 388.

For instance, the third signal distributor 373 and the fourth signal distributor 374 may receive the third output unit signal OU_3 and the fourth output unit signal OU_4 from the third image processing channel CH_3 and the fourth image processing channel CH_4, respectively. The third signal distributor 373 and the fourth signal distributor 374 may respectively provide the third output unit signal OU_3 and the fourth output unit signal OU_4 to the second channel combiner 384. The third to sixth signal distributors 373 to 376 may be configured similar to the first signal distributor 371 and the second signal distributor 372. In the exemplary embodiment shown in FIG. 10, the seventh signal distributor 377 and the eighth signal distributor 378 may simply buffer the seventh output unit signal OU_7 and the eighth output unit signal OU_8 provided from the seventh image processing channel CH_7 and the eighth image processing channel CH_8, respectively.

As an exemplary embodiment, the first to eighth signal distributors 371 to 378 may operate partly or entirely in accordance with an operation mode. For instance, when an operation mode using four image processing channels (e.g., the first to fourth image processing channels CH_1 to CH_4) is selected, the first to fourth signal distributors 371 to 374 may operate. When an operation mode using one image processing channel (e.g., the first image processing channels CH_1) is selected, the first signal distributor 371 may operate.

The configuration controller 390 may manage the overall operations of the image signal processing device 300 in accordance with an operation mode. As an exemplary embodiment, the configuration controller 390 may control at least one of the operation of each component of the channel converter block 320, the operation of each component of the signal selector block 330, the operation of the clock selector 340, the operation of each component of the signal distributor block 370, the operation of each component of the channel combiner block 380, and any combination thereof. In response to the control of the configuration controller 390, the components included in the image signal processing device 300 may operate in accordance with the aforementioned processes.

As an exemplary embodiment, the configuration controller 390 may operate one of the stream buffer 321 and the channel converters 322 to 328. The configuration controller 390 may operate the signal selectors that respectively receive the processing unit signals from the signal selector block 330 in accordance with an operation mode. The configuration controller 390 may operate one of the stream buffer 381 and the channel combiners 382 to 388 in accordance with an operation mode. The configuration controller 390 may operate one of the signal distributors that outputs one of the output unit signals from the signal distributor block 370 in accordance with an operation mode. Additionally, the configuration controller 390 may turn off at least one of the components which do not operate.

For instance, when an operation mode using four image processing channels (e.g., the first to fourth image processing channels CH_1 to CH_4) is selected, the configuration controller 390 may operate the second channel converter 324, the first to fourth signal selectors 331 to 334, the first to fourth signal distributors 371 to 374, and the second channel combiner 384. Additionally, the configuration controller 390 may turn off at least one of the components other than the second channel converter 324, the first to fourth signal selectors 331 to 334, the first to fourth signal distributors 371 to 374, and the second channel combiner 384.

Configurations and functions of the configuration controller 390 may include those of the configuration controller 190 shown in FIG. 3 or those of the configuration controller 290 shown in FIG. 6. Redundant descriptions associated with the configuration controller 390 will be omitted below for brevity of the description.

The number of each component aforementioned with reference to FIGS. 9 and 10 are just provided to help understanding of the present disclosure, and not to limit the present disclosure. The number of the image processing channels, the number of the channel converters, the number of the signal selectors, the number of the signal distributors, the number of the channel combiners, and the number of the reference clock signals may vary. Additionally, the number of the processing unit signals generated by each of the channel converters, the number of the processing unit signals provided to each of the signal selectors, the number of paths used to output the output unit signals from each of the signal distributors, and the number of the output unit signals combined by each of the channel combiners may vary. The image signal processing device 300 may be designed in one of other various configurations different from those shown in FIGS. 9 and 10.

According to the exemplary embodiment described with reference to FIGS. 9 and 10, it is possible to provide a signal processing path suitable for a selected operation mode. Therefore, selecting an operation mode may be more flexible, and the application scope of the image signal processing device 300 may be more varied.

Figure 11:
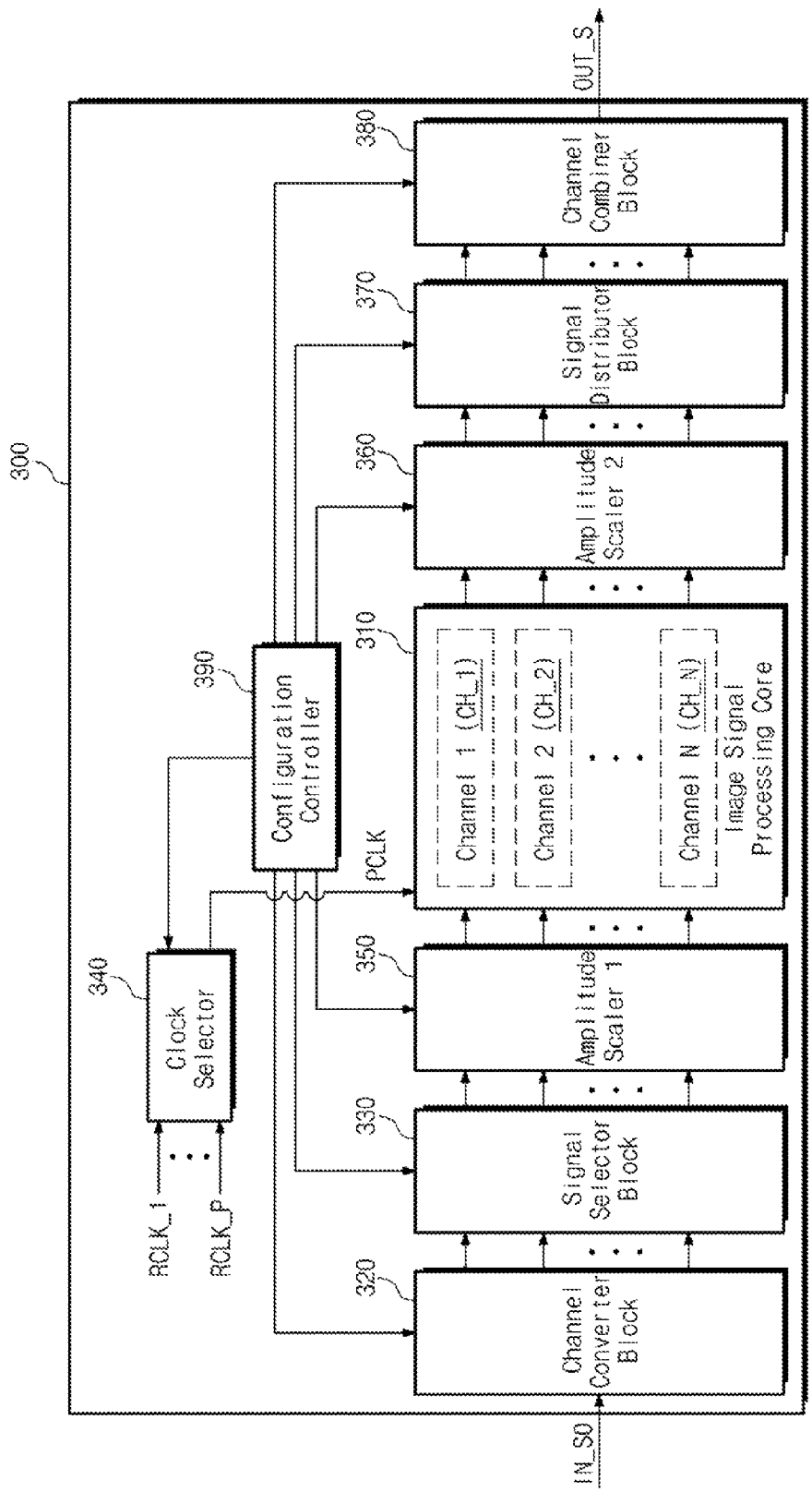
FIG. 11 is a block diagram illustrating an image signal processing device according to an exemplary embodiment of the present disclosure.

FIG. 11 is a block diagram illustrating an image signal processing device according to an exemplary embodiment of the present disclosure. An image signal processing device 300 may include an image signal processing core 310, a channel converter block 320, a signal selector block 330, a clock selector 340, a first amplitude scaler 350, a second amplitude scaler 360, a signal distributor block 370, a channel combiner block 380, and a configuration controller 390.

Configurations and functions of the image signal processing core 310, the channel converter block 320, the signal selector block 330, the clock selector 340, the signal distributor block 370, the channel combiner block 380, and the configuration controller 390 have been described with reference to FIGS. 9 and 10. Redundant descriptions associated with the image signal processing core 310, the channel converter block 320, the signal selector block 330, the clock selector 340, the signal distributor block 370, the channel combiner block 380, and the configuration controller 390 will be omitted below for brevity of the description.

The first amplitude scaler 350 may adjust each of amplitudes of selection target signals selected by a plurality of signal selectors of the signal selector block 330. The second amplitude scaler 360 may adjust each of amplitudes of output unit signals generated by the image signal processing core 310. The first amplitude scaler 350 and the second amplitude scaler 360 may be configured and operate similar to the first amplitude scaler 250 and the second amplitude scaler 260 mentioned with reference to FIGS. 6 to 8, respectively. Redundant descriptions associated with the first amplitude scaler 350 and the second amplitude scaler 360 will be omitted below for brevity of the description.

According to the exemplary embodiment shown in FIG. 11, selecting an operation mode may be more flexible, processing image signals may be improved and the image signal processing device 300 may become suited to a wider application scope. Additionally, as aforementioned with reference to FIGS. 6 to 8, a frequency value of the processing clock signal PCLK may decrease, and voltages of the processing unit signals may be reduced. Accordingly, the power consumed by the image signal processing device 300 may be reduced.

Figure 12:
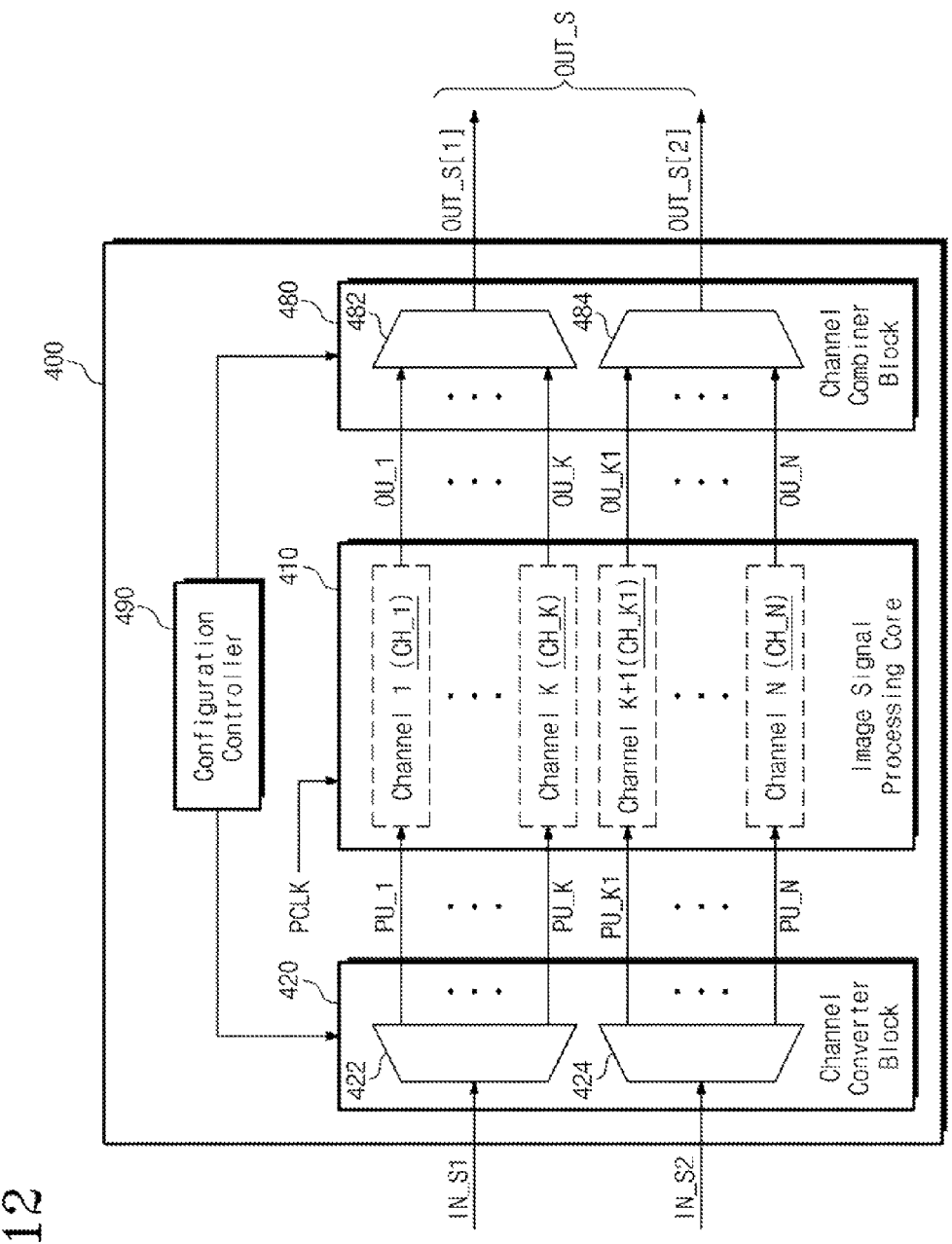
FIG. 12 s a block diagram illustrating an image signal processing device according to an exemplary embodiment of the present disclosure.

FIG. 12 is a block diagram illustrating an image signal processing device according to an exemplary embodiment of the present disclosure. An image signal processing device 400 may include an image signal processing core 410, a channel converter block 420, a channel combiner block 480, and a configuration controller 490.

The image signal processing device 400 may be implemented in an image sensor (e.g., the image sensor 1330 of FIG. 1, or at least one of the first image sensor 2331, the second image sensor 2332, and the third image sensor 2333 of FIG. 2) and/or an image signal processor (e.g., the image signal processor 1350 of FIG. 1, or the image signal processor 2350 of FIG. 2). The image signal processing device 400 may receive input signal streams IN_S1 and IN_S2, and generate an output signal stream OUT_S.

The image signal processing core 410 may include a plurality of image processing channels CH_1 to CH_N. Each of the image processing channels CH_1 to CH_N may perform an image signal processing operation. Configurations and functions of the image signal processing core 410 may include those of the image signal processing core 110 shown in FIG. 3, those of the image signal processing core 210 shown in FIG. 6, or those of the image signal processing core 310 shown in FIGS. 9 and 10. Redundant descriptions associated with the image signal processing core 410 will be omitted below for brevity of the description.

The channel converter block 420 may receive the input signal streams IN_S1 and IN_S2. In some exemplary embodiments, the first input signal stream IN_S1 may include first image signals that are generated by a first plurality of pixels, and the second input signal stream IN_S2 may include second image signals that are generated by a second plurality of pixels.

As an exemplary embodiment, the first pixels may be included in a first image sensor (e.g., the first image sensor 2331 of FIG. 2). The second pixels may be included in a second image sensor (e.g., the second image sensor 2332 or a third image sensor of FIG. 2) that is separately provided from the first image sensor. In the exemplary embodiment of FIG. 12, a circuit or device providing the first input signal stream IN_S1 may be different from a circuit or device providing the second input signal stream IN_S2.

The channel converter block 420 may include a first channel converter 422 and a second channel converter 424. The first channel converter 422 may receive the first input signal stream IN_S1. The first channel converter 422 may divide the first input signal stream IN_S1 by the processing units and generate a first plurality of processing unit signals PU_1 to PU_K. The second channel converter 424 may receive the second input signal stream IN_S2. The second channel converter 424 may divide the second input signal stream IN_S2 by the processing units and generate a second plurality of processing unit signals PU_K1 to PU_N. The processing unit signals PU_1 to PU_N may be provided to the image signal processing core 410.

Configurations and functions of each of the first channel converter 422 and the second channel converter 424 may include those of the channel converter 120 shown in FIG. 3, those of the channel converter 220 shown in FIG. 6, or those of the channel converters 322 to 328 of the channel converter block 320 shown in FIGS. 9 and 10. Redundant description of the first channel converter 422 and the second channel converter 424 will be omitted below for brevity of the description.

The image signal processing core 410 may receive the processing unit signals PU_1 to PU_N in parallel through the image processing channels CH_1 to CH_N. The image signal processing core 410 may receive the processing unit signals PU_1 to PU_N in parallel in response to a processing clock signal PCLK. In FIG. 12, it is illustrated that all the image processing channels CH_1 to CH_N operate. However, only some of the image processing channels CH_1 to CH_N may operate.

The image signal processing core 410 may process the processing unit signals PU_1 to PU_N in parallel through one or more of the image processing channels CH_1 to CH_N. The image signal processing core 410 may perform an image signal processing operation on the processing unit signals PU_1 to PU_N and generate a plurality of output unit signals OU_1 to OU_N. The output unit signals OU_1 to OU_N may be provided to the channel combiner block 480.

In an exemplary embodiment of FIG. 12, some of the image processing channels (e.g., the first to K-th image processing channels CH_1 to CH_K) may be allocated to receive and process the first plurality of processing unit signals PU_1 to PU_K in parallel. Additionally, the remaining image processing channels (e.g., the (K+1)-th to N-th image processing channels CH_K1 to CH_N), that are not allocated to the first plurality of processing unit signals PU_1 to PU_K from among the image processing channels CH_1 to CH_N, may be allocated to receive and process the second plurality of processing unit signals PU_K1 to PU_N in parallel. In some other embodiments, only some of the image processing channels (e.g., the (K+1)-th to N-th image processing channels CH_K1 to CH_N) may be allocated to receive and process the second plurality of processing unit signals PU_K1 to PU_N in parallel.

In an exemplary embodiment, the number of image processing channels allocated to the first plurality of processing unit signals PU_1 to PU_K, and the number of image processing channels allocated to the second plurality of processing unit signals PU_K1 to PU_N may be variously changed or modified. As an exemplary embodiment, the number of image processing channels allocated to process the first plurality of processing unit signals PU_1 to PU_K and the second plurality of processing unit signals PU_K1 to PU_N may vary based on at least one of the number of the first plurality of processing unit signals PU_1 to PU_K, the number of the second plurality of processing unit signals PU_K1 to PU_N, an operation mode, and any combination thereof.

However, the aforementioned exemplary embodiment is merely provided to help understanding of the present disclosure, and not to limit the present disclosure. The number of image processing channels that are allocated to the first plurality of processing unit signals PU_1 to PU_K and the second plurality of processing unit signals PU_K1 to PU_N may vary based on other various criteria.

In an exemplary embodiment of the present disclosure, the image processing channels may be allocated to perform various image signal processing operations. When the first channel converter 422 and the second channel converter 424 are configured similar to the channel converters of the channel converter block 320 of FIG. 9, allocating the image processing channels may more flexible.

Accordingly, when multiple input signal streams are provided, the image processing channels CH_1 to CH_N may be efficiently distributed to the processing unit signals PU_1 to PU_N in accordance with a transmission rate of each of the input signal streams. For instance, when a transmission rate of the first input signal stream IN_S1 is higher than that of the second input signal stream IN_S2, the first plurality of processing unit signals PU_1 to PU_K may be allocated to more image processing channels than the second plurality of processing unit signals PU_K1 to PU_N. According to an exemplary embodiment of the present disclosure, it is possible to improve performance, efficiency, and flexibility of an image signal processing operation.

The channel combiner block 480 may combine the output unit signals OU_1 to OU_N to generate the output signal stream OUT_S. For instance, the channel combiner block 480 may include a first channel combiner 482 and the second channel combiner 484. The first channel combiner 482 may combine the first output unit signals OU_1 to OU_K to generate a first output signal stream OUT_S[1]. The second channel combiner 484 may combine the second output unit signals OU_K1 to OU_N to generate a second output signal stream OUT_S[2]. The channel combiner block 480 may generate at least one output signal stream.

For instance, when the first input signal stream IN_S1 is generated by a front camera device and the second input signal stream IN_S2 is generated by a rear camera device, the first output signal stream OUT_S[1] may be used to generate an image corresponding to a front object and the second output signal stream OUT_S[2] may be used to generate an image corresponding to a rear object. For instance, when the first input signal stream IN_S1 and the second input signal stream IN_S2 are generated by a stereo camera device, the output signal stream OUT_S including the first output signal stream OUT_S[1] and the second signal stream OUT_S[2] may be used to generate a stereo image.

Configurations and functions of the first channel combiners 482 and the second channel combiners 484 may include those of the channel combiner 180 shown in FIG. 3, those of the channel combiner 280 shown in FIG. 6, or those of the channel combiners of the channel combiner block 380 shown in FIGS. 9 and 10. Redundant descriptions associated with the first channel combiner 482 and the second channel combiner 484 will be omitted below for brevity of the description.

The configuration controller 490 may manage the overall operations of the image signal processing device 400 in accordance with an operation mode. As an exemplary embodiment, the configuration controller 490 may vary the number of the first plurality of processing unit signals PU_1 to PU_K and the number of the second plurality of processing unit signals PU_K1 to PU_N by controlling an operation of the channel converter block 420. As an exemplary embodiment, the configuration controller 490 may select a frequency of the processing clock signal PCLK suitable for providing the processing unit signals PU_1 to PU_N in parallel to the image signal processing core 410. As an exemplary embodiment, the configuration controller 490 may control the channel combiner block 480 to control the combining of the output unit signals OU_1 to OU_N. However, these exemplary embodiments are merely provided to help understanding of the present disclosure, and not act limit the present disclosure.

Configurations and functions of the configuration controller 490 may include those of the configuration controller 190 shown in FIG. 3, those of the configuration controller 290 shown in FIG. 6, or those of the configuration controller 390 shown in FIGS. 9 and 10. Redundant descriptions associated with the configuration controller 490 will be omitted below for brevity of the description.

In FIG. 12, two input signal streams IN_S1 and IN_S2 are illustrated. However, the number of the input signal streams may be changed or modified in accordance with an application of the image signal processing device 400. The image signal processing device 400 may receive three or more input signal streams. Additionally, the image signal processing device 400 may further include the signal selector block 330 and the signal distributor block 370 of FIG. 9, and the first amplitude scaler 250 and the second amplitude scaler 260 of FIG. 6. The configuration shown in FIG. 12 is merely an example to help understanding of the present disclosure.

For instance, the number of image processing channels allocated to the first plurality of processing unit signals PU_1 to PU_K may be different from the number of image processing channels allocated to the second plurality of processing unit signals PU_K1 to PU_N. In this instance, a frequency of the processing clock signal PCLK for the image processing channels allocated to the first plurality of processing unit signals PU_1 to PU_K may be different from a frequency of the processing clock signal PCLK for the image processing channels allocated to the second plurality of processing unit signals PU_K1 to PU_N. Additionally, amplitudes of the first plurality of processing unit signals PU_1 to PU_K may be different from amplitudes of the second plurality of processing unit signals PU_K1 to PU_N.

In regard to FIGS. 3 to 12, the exemplary embodiments for processing image signals which are generated by image sensors with the image signal processing devices 100, 200, 300, and 400 are described. However, the exemplary embodiments of the present disclosure may be employed to perform image signal processing operations on image data that is stored in advance in a memory device or a storage device. For instance, an image signal processing device according to an exemplary embodiment of the present disclosure may perform an image signal processing operation by directly accessing a memory device or a storage device through a direct memory access (DMA) operation.

Figure 13:
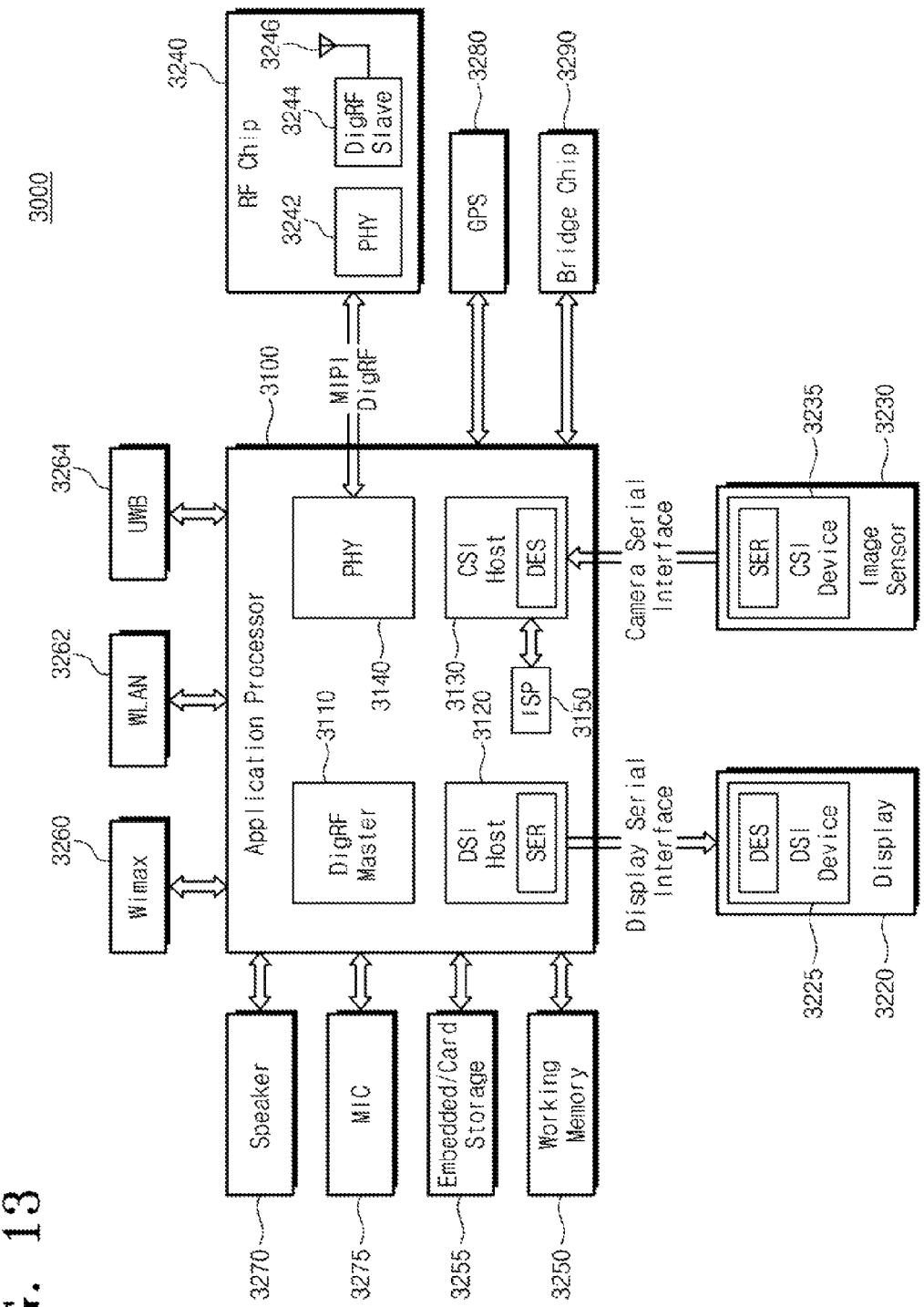
FIG. 13 is a block diagram illustrating an electronic system that includes an image signal processing device according to an exemplary embodiment of the present disclosure and interfaces thereof.

FIG. 13 is a block diagram illustrating an electronic system that includes an image signal processing device according to an exemplary embodiment of the present disclosure and interfaces thereof. An electronic system 3000 may be implemented in a data processing device capable of employing an interface that is proposed by Mobile Industry Processor Interface (MIPI) alliance. For instance, the electronic system 3000 may be implemented in an electronic device such as a portable communication terminal, a personal digital assistant (PDA), a portable media player (PMP), a smart phone, or a wearable device.

The electronic system 3000 may include an application processor 3100, a display 3220, and an image sensor 3230. The application processor 3100 may include a DigRF master 3110, a display serial interface (DSI) host 3120, a camera serial interface (CSI) host 3130, a physical layer 3140, and an image signal processor 3150.

The DSI host 3120 may communicate with a DSI device 3225 of the display 3220 in compliance with DSI. For instance, an optical serializer SER may be implemented in the DSI host 3120. For instance, an optical deserializer DES may be implemented in the DSI device 3225.

The CSI host 3130 may communicate with a CSI device 3235 of the image sensor 3230 in compliance with CSI. For instance, an optical deserializer DES may be implemented in the CSI host 3130. For instance, an optical serializer SER may be implemented in the CSI device 3235.

The image signal processor 3150 may communicate with the CSI host 3130 through a memory (e.g., a working memory 3250 or a memory embedded in the application processor 3100) and a bus. The image signal processor 3150 may be configured in accordance with at least one of the exemplary embodiments of the present disclosure that are aforementioned with reference to FIGS. 3 to 12. The image signal processor 3150 may include an image signal processing core that includes a plurality of image processing channels.

In FIG. 13, the application processor 3100 is illustrated as including the image signal processor 3150. However, unlike FIG. 13, in some exemplary embodiments, the image signal processor 3150 may be partly or entirely included in the image sensor 3230. In this exemplary embodiment, the image sensor 3230 may be configured in accordance with at least one of the exemplary embodiments of the present disclosure as described with reference to FIGS. 3 to 12. The image sensor 3230 may include an image signal processing core that includes a plurality of image processing channels. Redundant descriptions associated with the exemplary embodiments of the present disclosure will be omitted.

The electronic system 3000 may further include a radio frequency (RF) chip 3240 that communicates with the application processor 3100. The RF chip 3240 may include a physical layer 3242, a DigRF slave 3244, and an antenna 3246. For instance, the physical layer 3242 of the RF chip 3240 may exchange data with the physical layer 3140 of the application processor 3100 in compliance with DigRF interface that is proposed by the MIPI alliance.

The electronic system 300 may further include the working memory 3250 and an embedded/card storage 3255. The working memory 3250 and the embedded/card storage 3255 may store data received from the application processor 3100. Additionally, the working memory 3250 and the embedded/card storage 3255 may provide the application processor 3100 with the data stored therein.

The working memory 3250 may temporarily store data processed or to be processed by the application processor 3100. The working memory 3250 may include a volatile memory such as an SRAM, a DRAM, or an SDRAM, and/or a nonvolatile memory such as a flash memory, a PRAM, an MRAM, a ReRAM, or an FRAM. The embedded/card storage 3255 may store data regardless of whether power is supplied.

The electronic system 3000 may communicate with an external system through a communication module such as a worldwide interoperability for microwave access (Wimax) 3260, a wireless local area network (WLAN) 3262, or an ultra wideband (UWB) 3264. The electronic system 3000 may further include a speaker 3270 and a microphone 3275 for processing voice information. Additionally, the electronic system 3000 may further include a global positioning system (GPS) device 3280 for processing positional information. The electronic system 3000 may further include a bridge chip 3290 for managing connections with peripheral devices.

Figure 14:
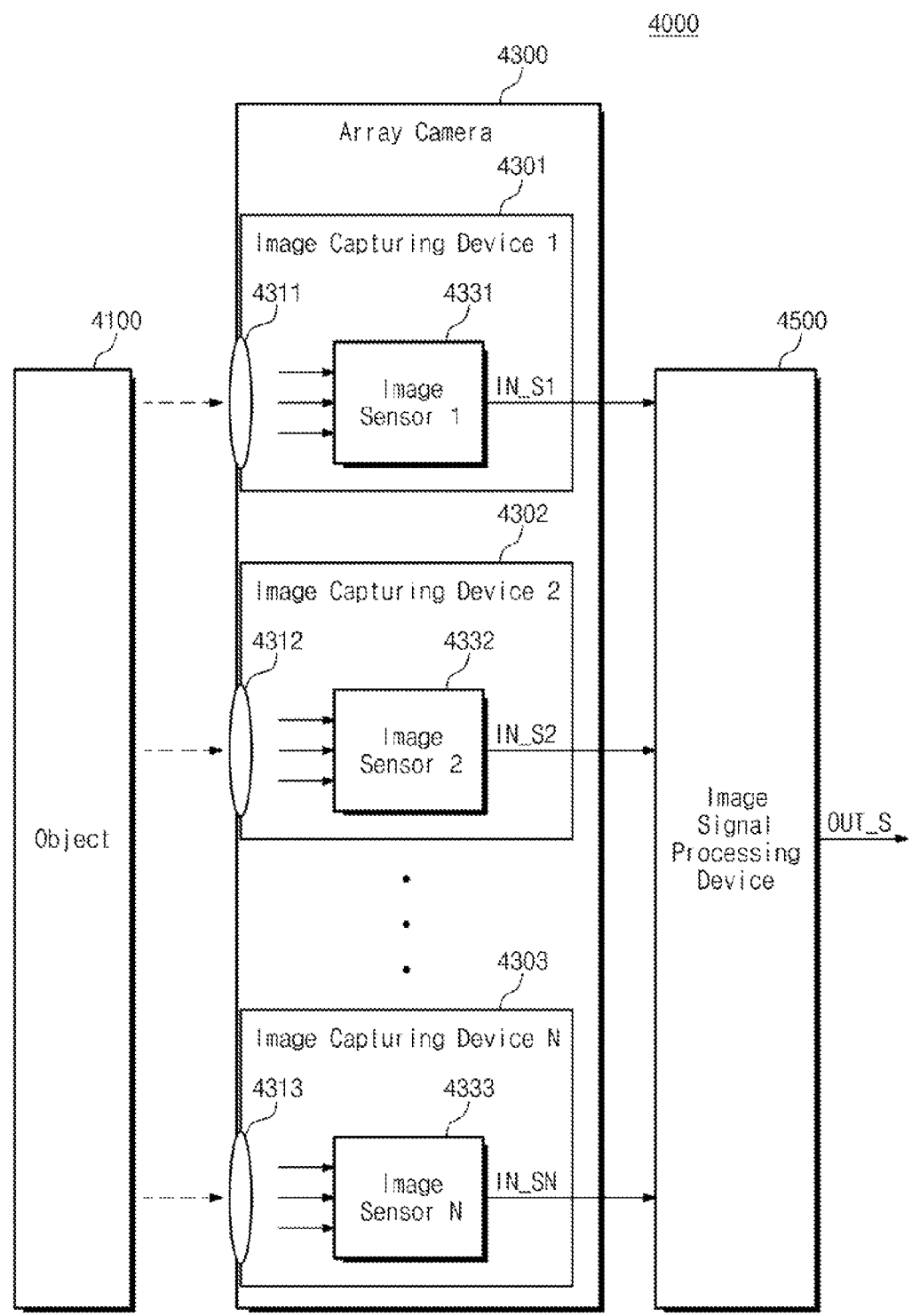
FIG. 14 is a block diagram illustrating an image capturing system that includes an image signal processing device according to an exemplary embodiment of the present disclosure.

FIG. 14 is a block diagram illustrating an image capturing system that includes an image signal processing device according to an exemplary embodiment of the present disclosure. An image capturing system 4000 may include an object 4100, an array camera 4300, and an image signal processing device 4500. The object 4100 may be a target to be captured. An image for the object 4100 may be generated by operations of the array camera 4300 and the image signal processing device 4500.

The array camera 4300 may be used for generating a precise image of the object 4100. To this end, the array camera 4300 may include a plurality of image capturing devices 4301, 4302, and 4303. The image capturing devices 4301, 4302, and 4303 may include lenses 4311, 4312, and 4313 and image sensors 4331, 4332, and 4333, respectively. The image capturing devices 4301, 4302, and 4303 may generate input signal streams IN_S1, IN_S2, and IN_SN, respectively.

The image signal processing device 4500 may receive the input signal streams IN_S1, IN_S2, and IN_SN. The image signal processing device 4500 may generate an output signal stream OUT_S by performing an image signal processing operation according to an exemplary embodiment of the present disclosure. The image signal processing device 4500 may be configured in accordance with at least one of the exemplary embodiments aforementioned with reference to FIGS. 3 to 12. The image signal processing device 4500 may include an image signal processing core that includes a plurality of image processing channels. According to the exemplary embodiments of the present disclosure, an image signal processing operation may be performed by a variety of configurations and power consumption of the image signal processing device 4500 may be reduced. Redundant descriptions associated with the exemplary embodiments of the present disclosure will be omitted.

A device configuration illustrated in each block diagram is provided to help understanding of the present disclosure. Each block may be formed of smaller blocks according to functions. Alternatively, a plurality of blocks may form a larger block according to a function. That is, the present disclosure is not limited to components illustrated in a block diagram.

While the present disclosure has been described with reference to some exemplary embodiments, it will be apparent to those skilled in the art that various changes and modifications may be made without departing from the spirit and scope of the present disclosure set forth throughout the annexed claim matters. Therefore, it should be understood that the above exemplary embodiments are not limiting, but illustrative, hence all technical matters within the annexed claims and the equivalents thereof may be construed as properly belonging to the territory of the present disclosure.

What is claimed is:

1. An image signal processing device comprising:
a channel converter configured to divide an input signal stream by processing units and generate a plurality of processing unit signals, the input signal stream comprising image signals generated by a plurality of pixels of an image sensor;
an image signal processing core comprising a plurality of image processing channels, each of the plurality of image processing channels configured to perform an image signal processing operation, the image signal processing core configured to generate a plurality of output unit signals by receiving and processing the plurality of processing unit signals in parallel through one or more of the plurality of image processing channels;
a channel combiner configured to combine the plurality of output unit signals and generate an output signal stream; and
a configuration controller configured to control, according to an operation mode, at least one of a number of the plurality of processing unit signals, selection of a frequency of a processing clock signal that is used to provide the plurality of processing unit signals in parallel to the image signal processing core and a combination of the plurality of output unit signals,
wherein a number of image processing channels that are allocated to process the plurality of processing unit signals from among the plurality of image processing channels varies based on at least one of the operation mode and the number of the plurality of processing unit signals.

2. The image signal processing device of claim 1, wherein at least one of the plurality of processing unit signals and the plurality of output unit signals are image signals respectively corresponding to pixel units of the plurality of pixels.

3. The image signal processing device of claim 1, wherein the number of the processing unit signals is less than or equal to the number of the plurality of image processing channels.

4. The image signal processing device of claim 1, wherein the image signal processing core further comprises:
a reference processor configured to process a target processing unit signal by referring to one or more of processing unit signals other than the target processing unit signal from among the plurality of processing unit signals.

5. The image signal processing device of claim 1, wherein the plurality of image processing channels is configured as a plurality of group channels, each of the plurality of group channels comprising a selected number of image processing channels, and
wherein each of the plurality of group channels is configured to process processing unit signals respectively corresponding to the selected number of image processing channels from among the plurality of processing unit signals.

6. The image signal processing device of claim 1, further comprising:
a clock selector configured to provide one of a plurality of reference clock signals to the image signal processing core as the processing clock signal in accordance with the operation mode, the plurality of reference clock signals having different frequency values.

7. The image signal processing device of claim 6, wherein the clock selector is configured to select, as the processing clock signal, a reference clock signal, from among the plurality of reference clock signals, having a frequency value obtained by dividing a frequency value of a stream clock signal that is used to receive the input signal stream by the number of the allocated image processing channels, according to a control of the configuration controller.

8. The image signal processing device of claim 6, further comprising:
a first amplitude scaler configured to adjust each of amplitudes of the plurality of processing unit signals; and
a second amplitude scaler configured to adjust each of amplitudes of the plurality of output unit signals.

9. The image signal processing device of claim 8, wherein the first amplitude scaler is configured to decrease each of voltage amplitudes of the plurality of processing unit signals, and
wherein the second amplitude scaler is configured to increase each of voltage amplitudes of the plurality of output unit signals.

10. The image signal processing device of claim 8, wherein amounts of adjusting each of the amplitudes of the plurality of processing unit signals and the plurality of output unit signals vary according to a control of the configuration controller.

11. The image signal processing device of claim 1, wherein each of the channel converter, the image signal processing core, the channel combiner, and the configuration controller is implemented in one of an operation processing device including an application processor, and an image sensor.

12. An image signal processing device comprising:
a channel converter configured to: divide a first input signal stream by processing units and generate a first plurality of processing unit signals, the first input signal stream comprising first image signals generated by a first plurality of pixels of an image sensor, and
divide a second input signal stream by the processing units and generate a second plurality of processing unit signals, the second input signal stream comprising second image signals generated by a second plurality of pixels of the image sensor;
an image signal processing core comprising a plurality of image processing channels, each of the plurality of image processing channels being configured to perform an image signal processing operation, the image signal processing core being configured to generate a plurality of output unit signals by receiving and processing the first and second plurality of processing unit signals in parallel through one or more of the plurality of image processing channels;
a channel combiner configured to combine the plurality of output unit signals and generate at least one output signal stream; and
a configuration controller configured to control, according to an operation mode, at least one of a number of the first plurality of processing unit signals, a number of the second plurality of processing unit signals, selection of a frequency of a processing clock signal that is used to provide the first and second plurality of processing unit signals in parallel to the image signal processing core, and makeup of the combination of the plurality of output unit signals, wherein a number of image processing channels that are allocated to process the first plurality of processing unit signals and a number of image processing channels that are allocated to process the second plurality of processing unit signals, from among the plurality of image processing channels, vary based on at least one of the operation mode, the number of the first plurality of processing unit signals, and the number of the second plurality of processing unit signals.

13. The image signal processing device of claim 12, wherein some of the plurality of image processing channels are allocated to receive and process the first plurality of processing unit signals in parallel, and one or more of remaining image processing channels that are not allocated for the first plurality of processing unit signals from among the plurality of image processing channels are allocated to receive and process the second plurality of processing unit signals in parallel.

14. The image signal processing device of claim 12, wherein the first plurality of pixels is included in a first image sensor, and the second plurality of pixels is included in a second image sensor that is independent from the first image sensor.

15. The image signal processing device of claim 12, wherein the operation mode is selected in association with at least one of a number of operating image processing channels and power consumption.

16. The image signal processing device of claim 12, further comprising:
a control register configured to store a configuration value corresponding to the operation mode,
wherein the configuration controller operates based on the configuration value.

17. An image signal processing device comprising:
a channel converter that receives an input signal stream from an image sensor, and divides the input signal stream into one or more processing unit signals;
an image signal processing core, comprising a plurality of image processing channels, that performs an operation on the one or more processing unit signals to generate one or more output unit signals,
wherein the image processing channels operate in parallel; and
a channel combiner that combines the one or more output unit signals to generate an output signal stream.

18. The image signal processing device of claim 17, wherein the operation performed by the image signal processing core includes one or more of bad pixel correction, demosaicing, noise reduction, lens shading correction, gamma correction, and edge enhancement.

19. The image signal processing device of claim 17, further comprising a configuration controller managing the image signal processing core by selecting a number of processing unit signals for the channel converter to generate and selecting a frequency of a processing clock signal to be provided to the image signal processing core.

20. The image signal processing device of claim 19, further comprising a first amplitude scaler to reduce a voltage amplitude of each of the one or more processing unit signals before transmitting the one or more processing unit signals to the image signal processing core; and
a second amplitude scaler to increase a voltage amplitude of the one or more output unit signals before transmitting the one or more output unit signals to the channel combiner,
wherein the configuration controller selects a lower frequency, than a frequency of the input signal stream, for the processing clock signal in response to the reduced voltage of each of the one or more processing unit signals.

* * * * *